United States Patent
Kumar et al.

(10) Patent No.: US 10,958,729 B2
(45) Date of Patent: Mar. 23, 2021

(54) NON-VOLATILE MEMORY EXPRESS OVER FABRIC (NVMEOF) USING VOLUME MANAGEMENT DEVICE

(71) Applicant: Intel Corporation, Santa Clara, CA (US)

(72) Inventors: Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 15/599,020

(22) Filed: May 18, 2017

(65) Prior Publication Data

US 2018/0337991 A1  Nov. 22, 2018

(51) Int. Cl.
*H04L 29/08* (2006.01)
*G06F 3/06* (2006.01)
*G06F 9/455* (2018.01)
*H04L 12/24* (2006.01)
*H04L 29/06* (2006.01)

(52) U.S. Cl.
CPC .......... *H04L 67/1097* (2013.01); *G06F 3/067* (2013.01); *G06F 9/45533* (2013.01); *H04L 41/0803* (2013.01); *H04L 69/26* (2013.01)

(58) Field of Classification Search
CPC ...... G06F 3/0062; G06F 3/0665; G06F 3/067; G06F 3/0683; G06F 3/0685; G06F 3/0689; G06F 9/45558; G06F 9/45533; H04L 67/1097
See application file for complete search history.

(56) References Cited

U.S. PATENT DOCUMENTS

| 9,294,567 | B2* | 3/2016 | Hussain | G06F 3/0605 |
| 9,430,268 | B2* | 8/2016 | Hussain | H04L 67/1097 |
| 9,430,372 | B2* | 8/2016 | Nachimuthu | G06F 12/0868 |
| 9,454,380 | B2* | 9/2016 | Kumar | G06F 11/3672 |
| 9,529,773 | B2* | 12/2016 | Hussain | G06F 3/0683 |
| 9,565,269 | B2* | 2/2017 | Malwankar | G06F 3/0614 |
| 9,712,619 | B2* | 7/2017 | Malwankar | G06F 9/45558 |
| 9,785,355 | B2* | 10/2017 | Huang | H04L 67/1004 |
| 10,063,638 | B2* | 8/2018 | Huang | H04L 29/08 |

(Continued)

*Primary Examiner* — Lashonda T Jabobs
(74) *Attorney, Agent, or Firm* — Compass IP Law, PC

(57) ABSTRACT

Non-volatile Memory Express over Fabric (NVMeOF) using Volume Management Device (VMD) schemes and associated methods, systems and software. The schemes are implemented in a data center environment including compute resources in compute drawers and storage resources residing in pooled storage drawers that are communicatively couple via a fabric. Compute resources are composed as compute nodes or virtual machines/containers running on compute nodes to utilize remote storage devices in pooled storage drawers, while exposing the remote storage devices as local NVMe storage devices to software running on the compute nodes. This is facilitated by virtualizing the system's storage infrastructure through use of hardware-based components, firmware-based components, or a combination of hardware/firmware- and software-based components. The schemes support the use of remote NVMe storage devices using an NVMeOF protocol and/or use of non-NVMe storage devices using NVMe emulation.

25 Claims, 20 Drawing Sheets

(56) References Cited

U.S. PATENT DOCUMENTS

| | | | |
|---|---|---|---|
| 10,069,749 B1* | 9/2018 | Narkier | G06F 9/5011 |
| 10,277,677 B2* | 4/2019 | Nachimuthu | G06F 12/00 |
| 10,649,921 B2* | 5/2020 | York | G06F 13/12 |
| 10,687,434 B2* | 6/2020 | Kumar | G06F 3/0631 |
| 2013/0031308 A1* | 1/2013 | De Spiegeleer | G06F 3/067 |
| | | | 711/122 |
| 2015/0006663 A1* | 1/2015 | Huang | G06F 13/00 |
| | | | 709/213 |
| 2017/0054603 A1* | 2/2017 | Kulkarni | H04L 41/0893 |
| 2017/0286352 A1* | 10/2017 | Kumar | G06F 13/4022 |
| 2018/0026800 A1* | 1/2018 | Munoz | G06F 3/0664 |
| | | | 713/156 |
| 2018/0077235 A1* | 3/2018 | Nachimuthu | G06F 13/00 |
| 2018/0191721 A1* | 7/2018 | Freyensee | H04L 9/0822 |
| 2018/0192540 A1* | 7/2018 | Kumar | G06F 3/0689 |
| 2019/0171601 A1* | 6/2019 | Nachimuthu | G06F 9/45558 |

* cited by examiner

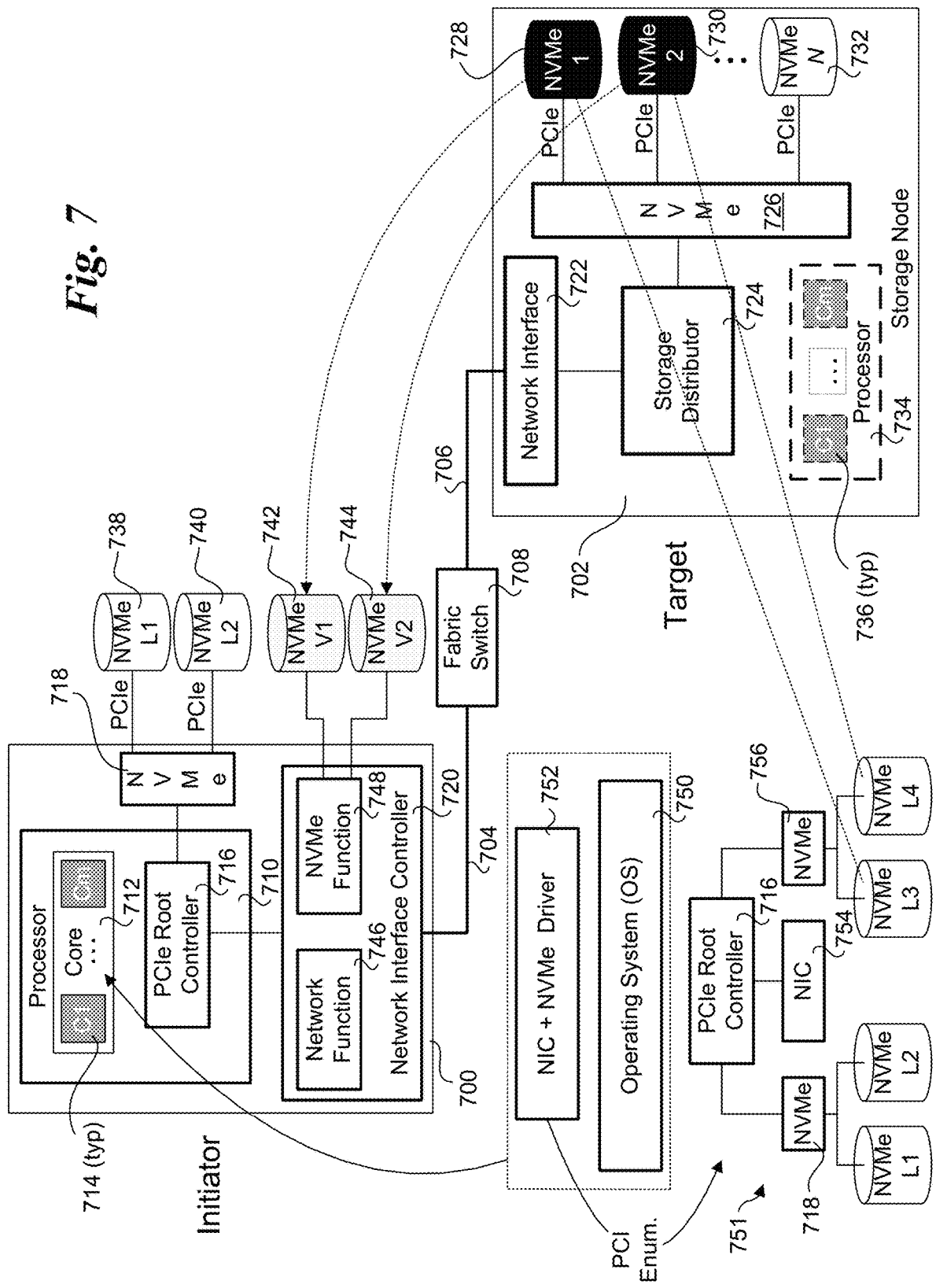

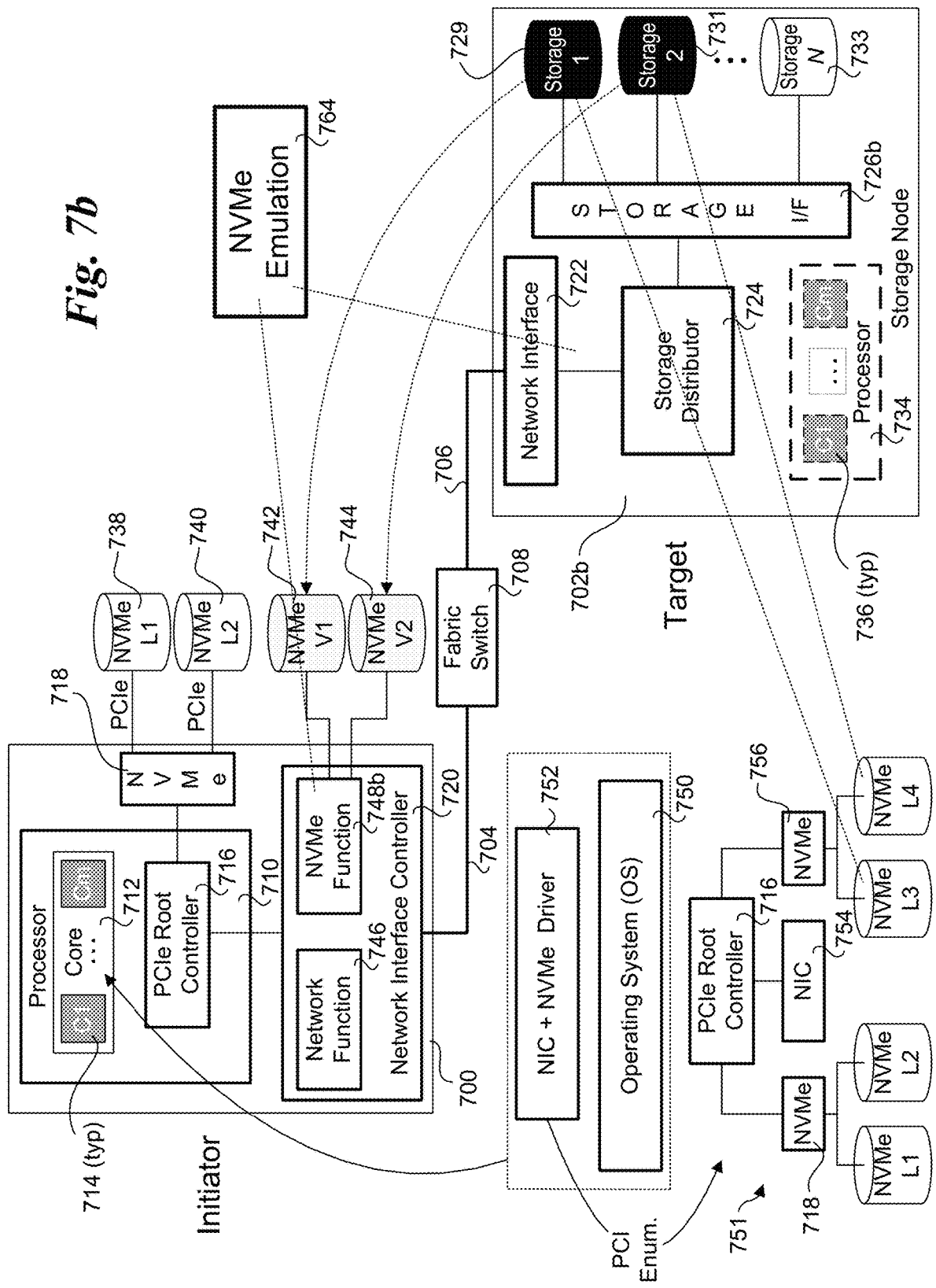

NON-VOLATILE MEMORY EXPRESS OVER FABRIC (NVMEOF) USING VOLUME MANAGEMENT DEVICE

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades. While the term "drawers" are used herein, it will be recognized by those skilled in the art that drawers and chassis are generally analogous terms.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google Gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchases IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

IaaS usage for a given customer typically involves allocation of data center resources. For example, a typical AWS user may request use of one of 24 different EC2 instances, which range from a t2.nano instance with 0.5 Gigabyte (GB) of memory, 1 core/variable cores/compute units and no instance storage to an hs1.8xlarge with 117 GB of memory, 16/35 cores/compute units and 48000 GB of instance storage. Each allocated EC2 instance consumes certain physical datacenter resources (e.g. compute, memory storage). At the same time, datacenter racks may support a multitude of different configurations. To maximum resource allocation, the IaaS operator needs to track what resources are available in which rack.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a schematic diagram illustrating a virtualized storage access scheme under which remote storage devices on a Target are exposed to an operating system on an Initiator as local storage devices, wherein an NVMe function is implemented in a network interface controller (NIC);

FIG. 7b is a schematic diagram illustrating a variation of the embodiment of FIG. 7 under which assess to non-NVMe storage devices on the Target are accessed using NVMe emulation;

DETAILED DESCRIPTION

Figure 1:
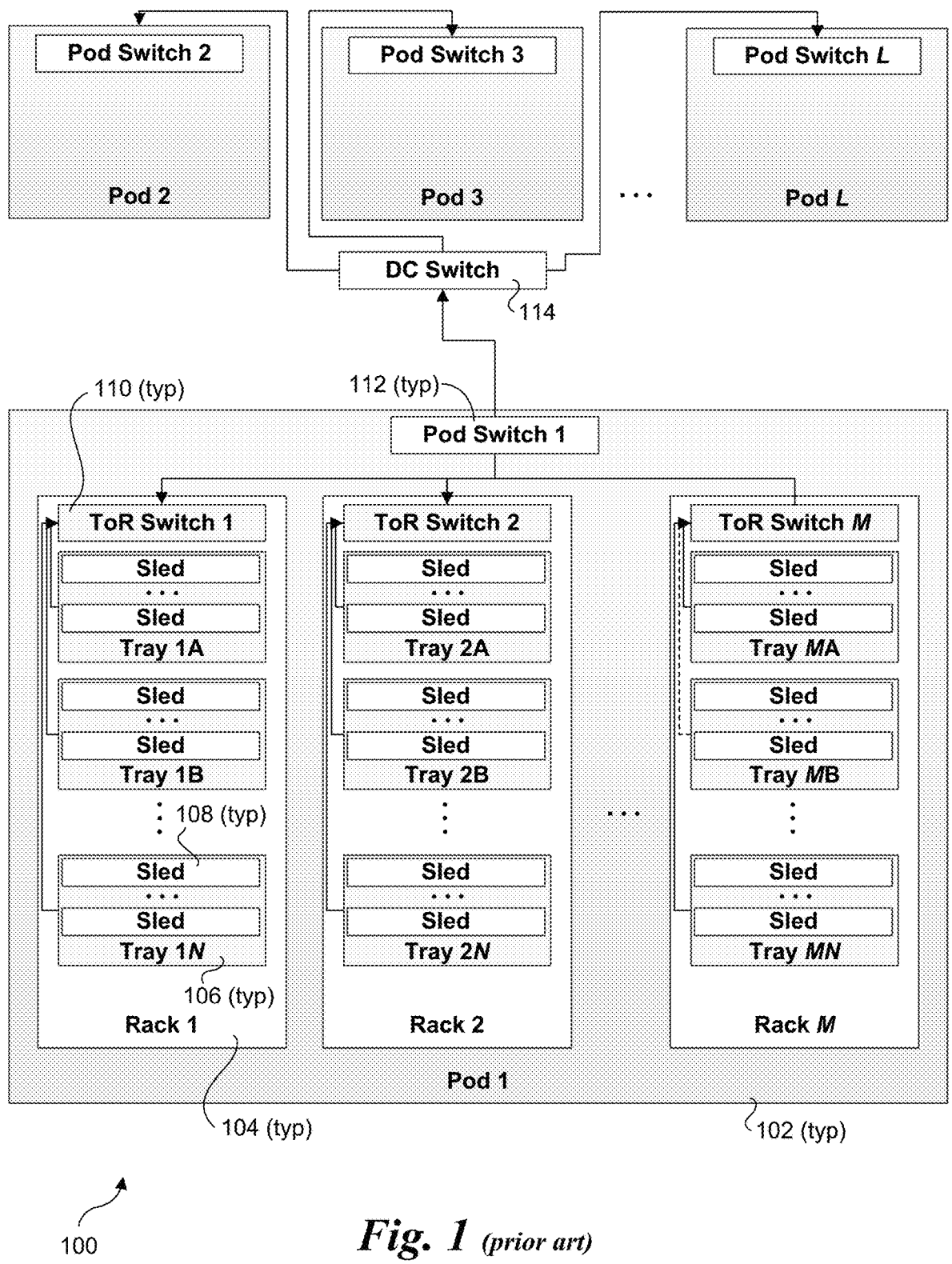
FIG. 1 is a schematic diagram of a conventional physical rack configuration in a data center.

Embodiments of Non-volatile Memory Express over Fabric (NVMeOF) using Volume Management Device (VMD) schemes and associated methods, systems and software are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation introduced new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 2:
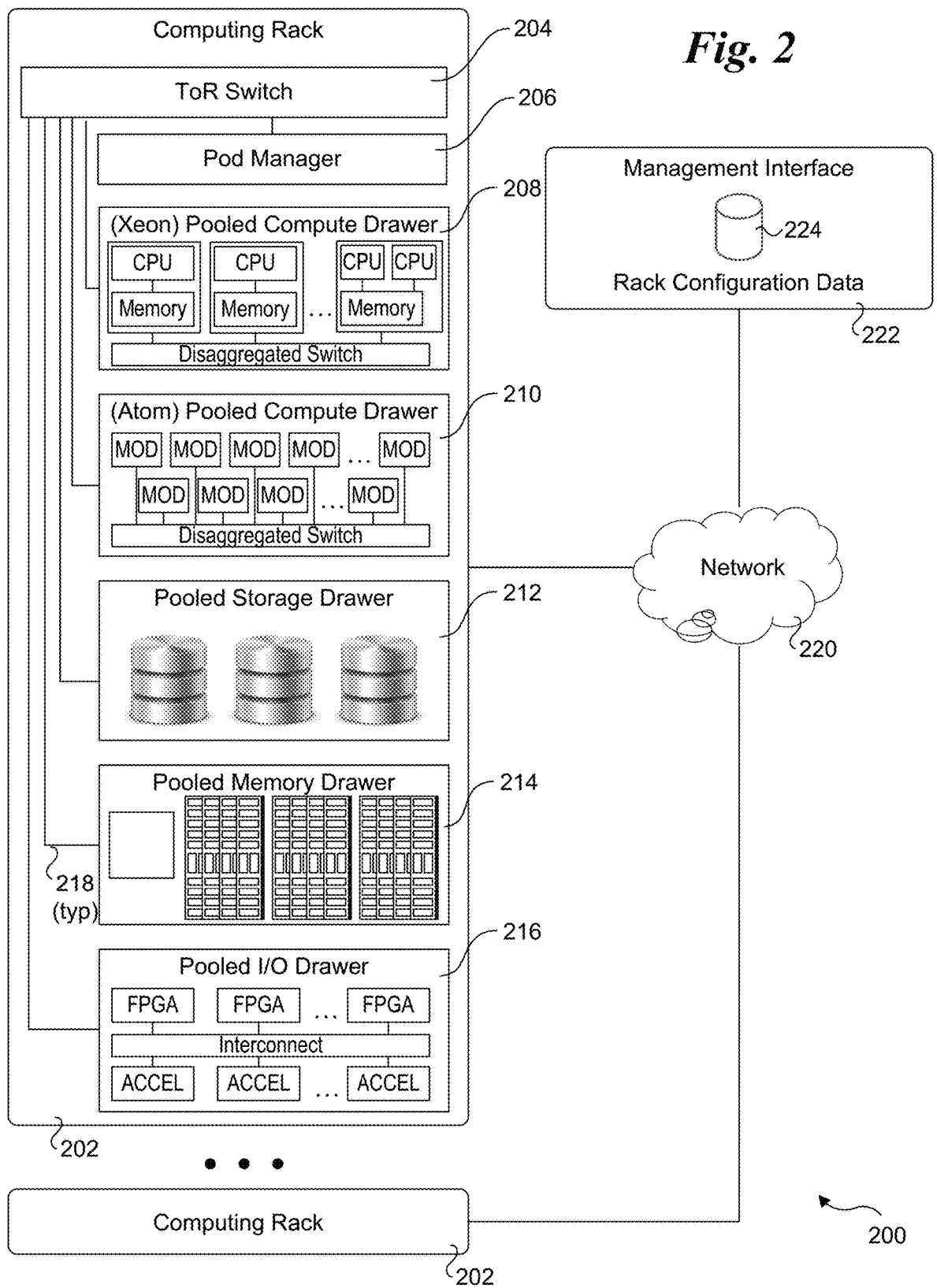
FIG. 2 is a schematic diagram of a Rack Scale Design (RSD) configuration in a data center, according to one embodiment.

An exemplary RSD environment 200 is illustrated in FIG. 2. RSD environment 200 includes multiple computing racks 202, each including a Top of Rack (ToR) switch 204, a pod manager 206, and a plurality of pooled system drawers. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an INTEL® XEON® pooled computer drawer 208, and INTEL® ATOM™ pooled compute drawer 210, a pooled storage drawer 212, a pooled memory drawer 214, and an pooled I/O drawer 216. Each of the pooled system drawers is connected to ToR switch 204 via a high-speed link 218, such as a 40 Gigabit/second (Gb/s) or 100 Gb/s Ethernet link or an 100+Gb/s Silicon Photonics (SiPh) optical link. In one embodiment high-speed link 218 comprises an 800 Gb/s SiPh optical link.

Multiple of the computing racks 200 may be interconnected via their ToR switches 204 (e.g., to a pod-level switch or data center switch), as illustrated by connections to a network 220. In some embodiments, groups of computing racks 202 are managed as separate pods via pod manager(s) 206. In one embodiment, a single pod manager is used to manage all of the racks in the pod. Alternatively, distributed pod managers may be used for pod management operations.

RSD environment 200 further includes a management interface 222 that is used to manage various aspects of the RSD environment. This includes managing rack configuration, with corresponding parameters stored as rack configuration data 224.

Figure 3:
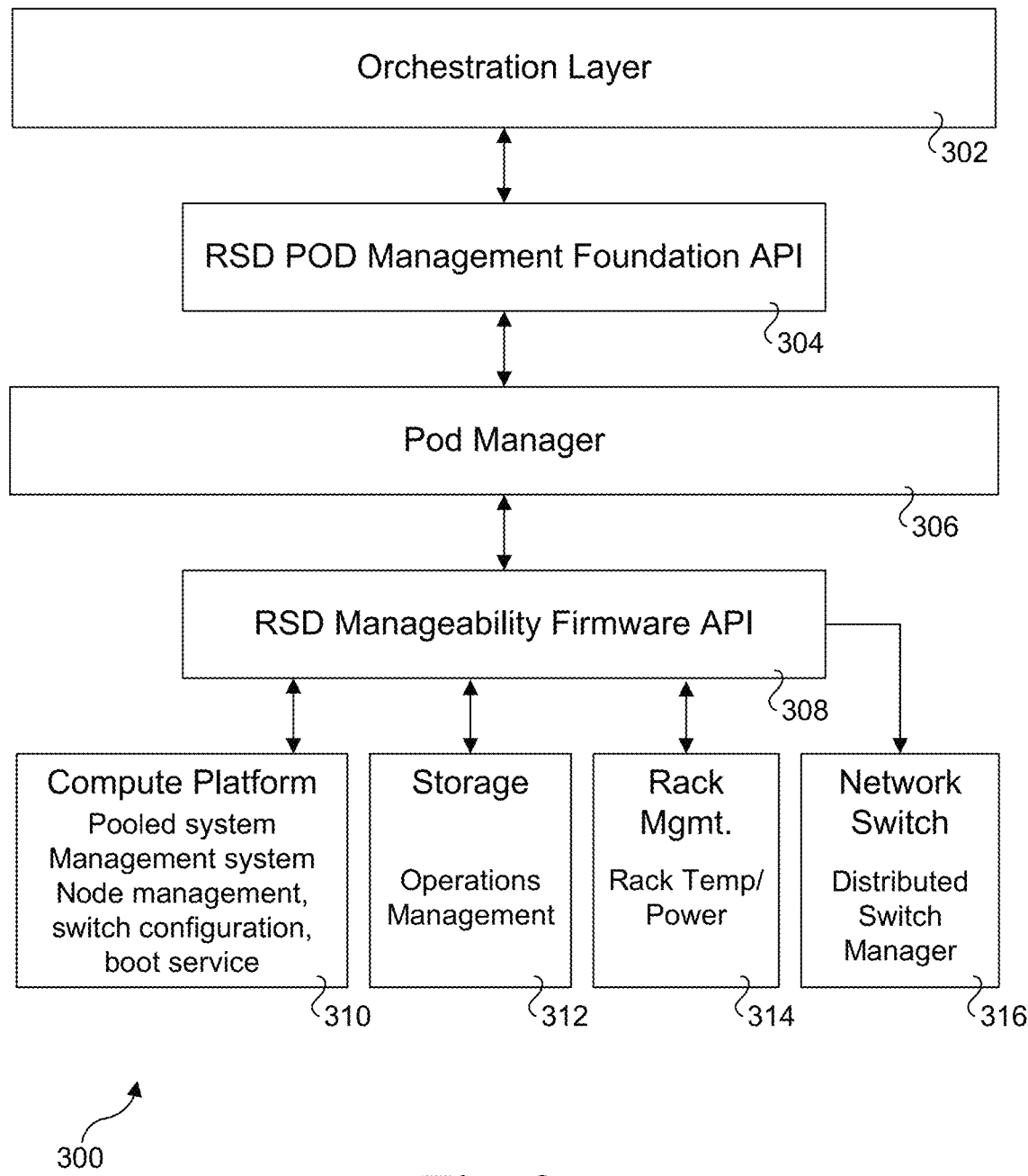
FIG. 3 is a block diagram of an RSD management architecture, according to one embodiment

FIG. 3 shows one embodiment of an RSD management architecture 300. The RSD management architecture includes multiple software and firmware components configured in a layered architecture including an orchestration layer 302, an RSD pod management foundation API (Application Program Interface), a pod manager 306, and an RSD manageability firmware API 308. The bottom layer of RSD management architecture includes a compute platform management component 310, a storage management component 312, a rack management components 314, and a network switch management component 316.

The compute platform management component 310 performs operations associated with compute drawers and includes a pooled system, a management system, node management, switch configuration, and boot service. Storage management component 312 is configured to support operation management of pooled storage drawers. Rack management component 314 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 2. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 4 and discussed below.

Figure 4:
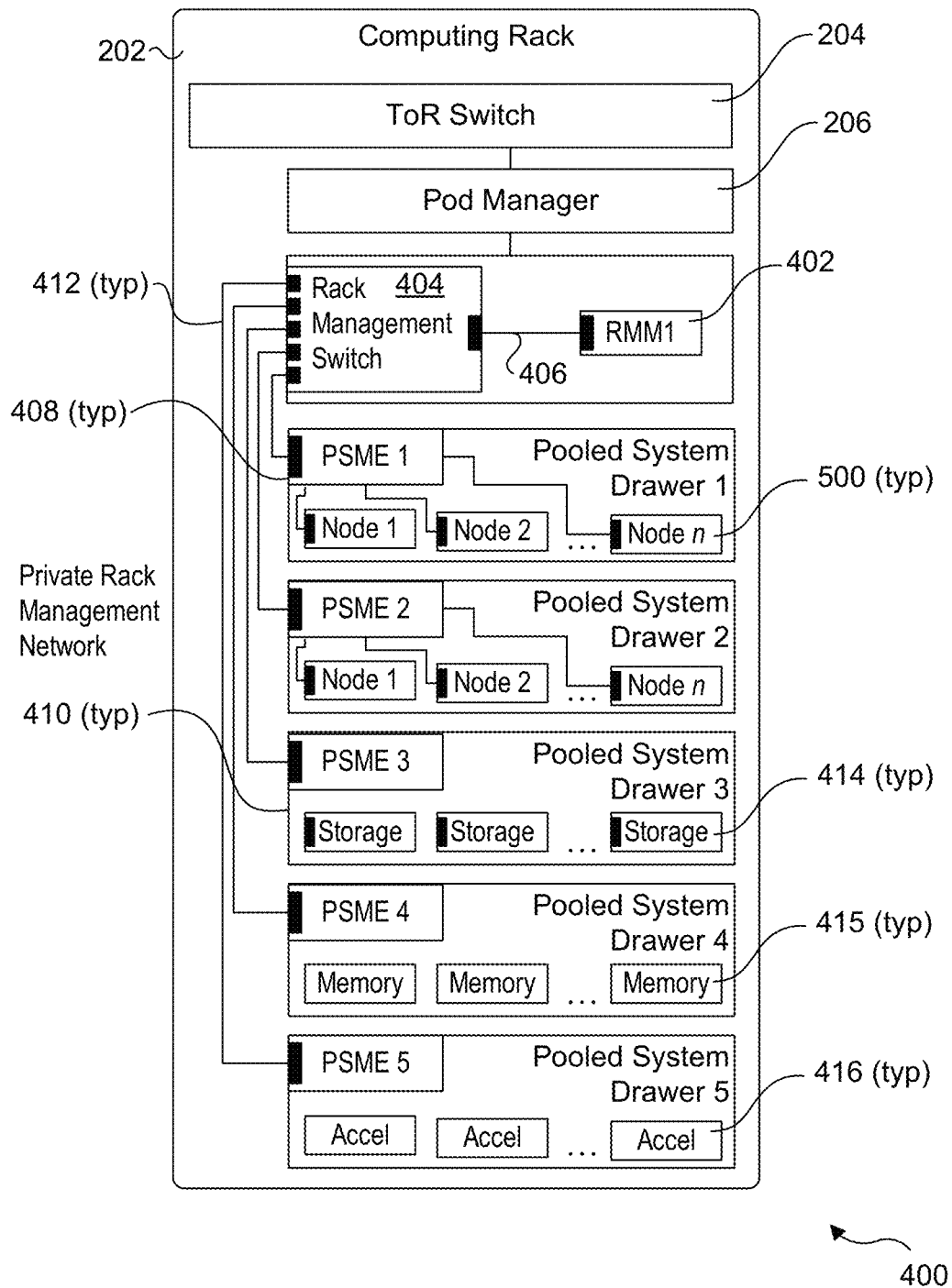
FIG. 4 is a schematic diagram showing further details of an RSD rack implementing Pooled System Management Engines (PSMEs)

FIG. 4 shows one embodiment of a rack configuration 400 employing rack management and configuration components that communicate over a private rack management network. The rack management and configuration components include an RMM 402 coupled in communication with a rack management switch 404 via a link 406. A respective PSME 408 is associated with each of five pooled system drawers 410. Each PSME 408 is connected to rack management switch 404 via a link 412. The rack management switch is also connected to POD Manager 206. In the illustrated embodiment, each of pooled system drawers 1 and 2 includes a plurality of compute nodes 500, while pooled system drawers 3, 4, and 5 respective include a plurality of storage resources 414, a plurality of memory resources 415, and a plurality of IO accelerator resources 416.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

Current enterprise/cloud computer systems have volatile memory, for example DRAM (Dynamic Random Access Memory) memory, and storage class non-volatile memory such as 3D crosspoint (3D XPOINT™) technology DIMMs (Dual In-line Memory Modules), which are populated locally within the compute node. Other types of memory may also be used.

Non-volatile memory is a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of storage devices that implement such standards may be referred to as DDR-based interfaces.

The Rack Scale system uses these compute nodes and storage nodes (Non-volatile memory, SATA and NVM Express (NVMe) storage devices, etc.) to compose a system based on user needs. In embodiments described below, NVMe storage devices in storage nodes (aka pooled storage drawers) are accessed from compute platforms over a low latency fabric using an NVMe Over Fabric (NVMeOF) protocol. In conjunction with accessing NVMe storage devices over the fabric, the NVMe devices are made to appear to an operating system as locally-attached devices (i.e., attached to the compute platforms), which may be accessed by existing software, such as applications, without requiring modification to the software. As described in detail below, the foregoing functionality is implemented via a hardware-based scheme, a primarily software-based scheme, and a combined hardware and firmware scheme.

Figure 5:
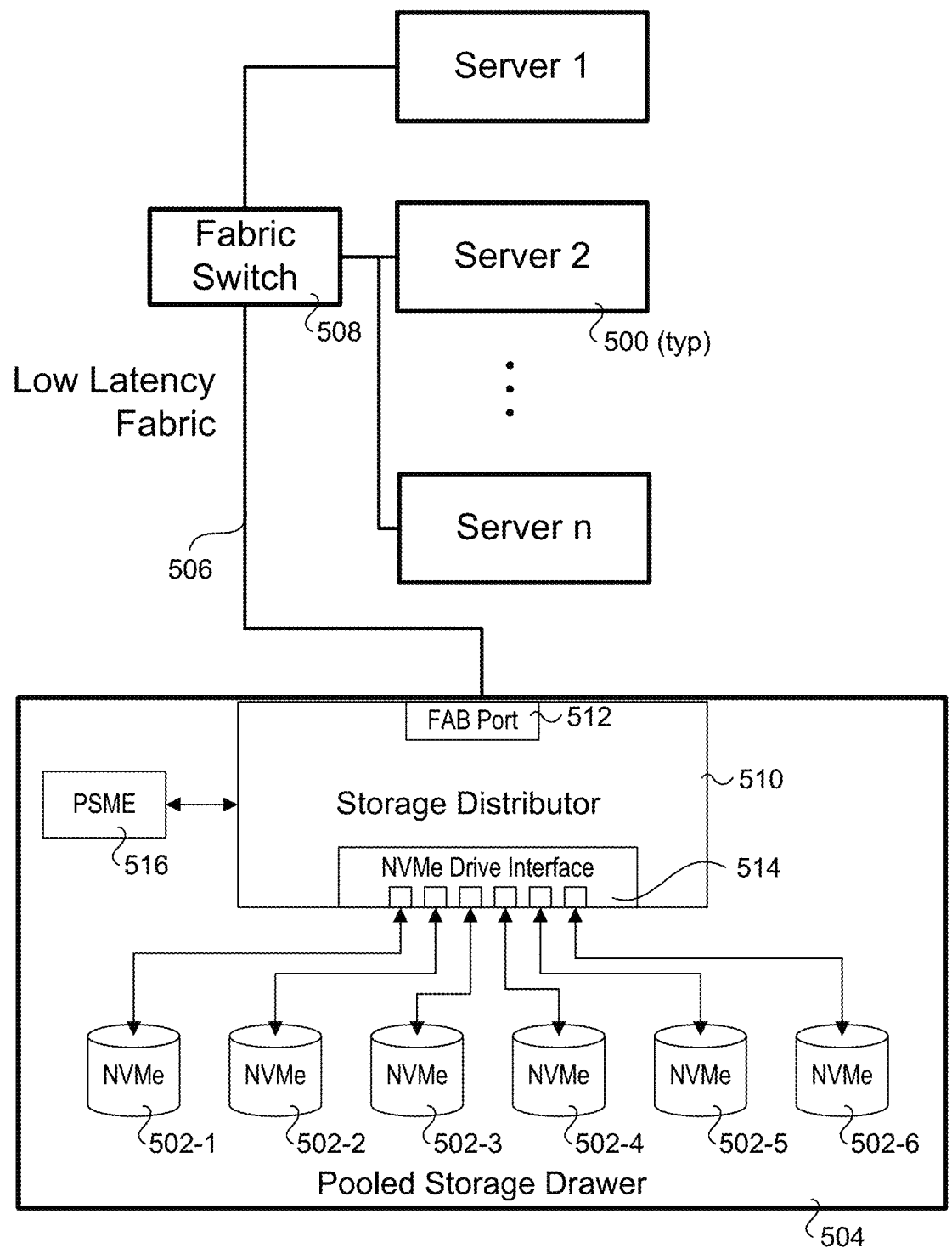
FIG. 5 is a schematic diagram illustrating an overview of a remote storage access mechanism under which servers are enabled to access NVMe storage devices over a low latency fabric.

An overview illustrated NVMe storage aspects of the concept is illustrated in FIG. 5. Under the mechanism, each of a plurality of compute nodes, such as servers 500, is enabled to access NVMe storage devices 502-1 . . . 502-6 in a pooled storage drawer 704 via a low latency fabric 506 and a fabric switch 508. Pooled storage drawer 704 further includes a storage distributor 510 having a fabric port 512 and an NVMe driver interface 514. A PSME 516 is also coupled to storage distributor 510; generally the PSME may either be integrated in a pooled storage drawer (as shown) or external to the pooled storage drawer.

In one embodiment, the low latency fabric comprises an INTEL® Omni-Path fabric, which employs the INTEL® Omni-Path Architecture (OPA). OPA employs a host fabric interface (HFI) at each fabric endpoint and a fabric switch that is used to forward fabric packets along routes between fabric endpoints. In another embodiment, the low latency fabric comprises an Ethernet network that uses high-speed Ethernet links (e.g., 100 Gigabit per second), and Ethernet switches. For illustrative purposes herein, fabric switches are shown that correspond to Omni-Path fabric switches or Ethernet switches, depending on the implementations context. In addition to Omni-Path and Ethernet fabrics, other existing and future network technologies may be used in a similar manner to that described and illustrated herein.

Figure 5A:
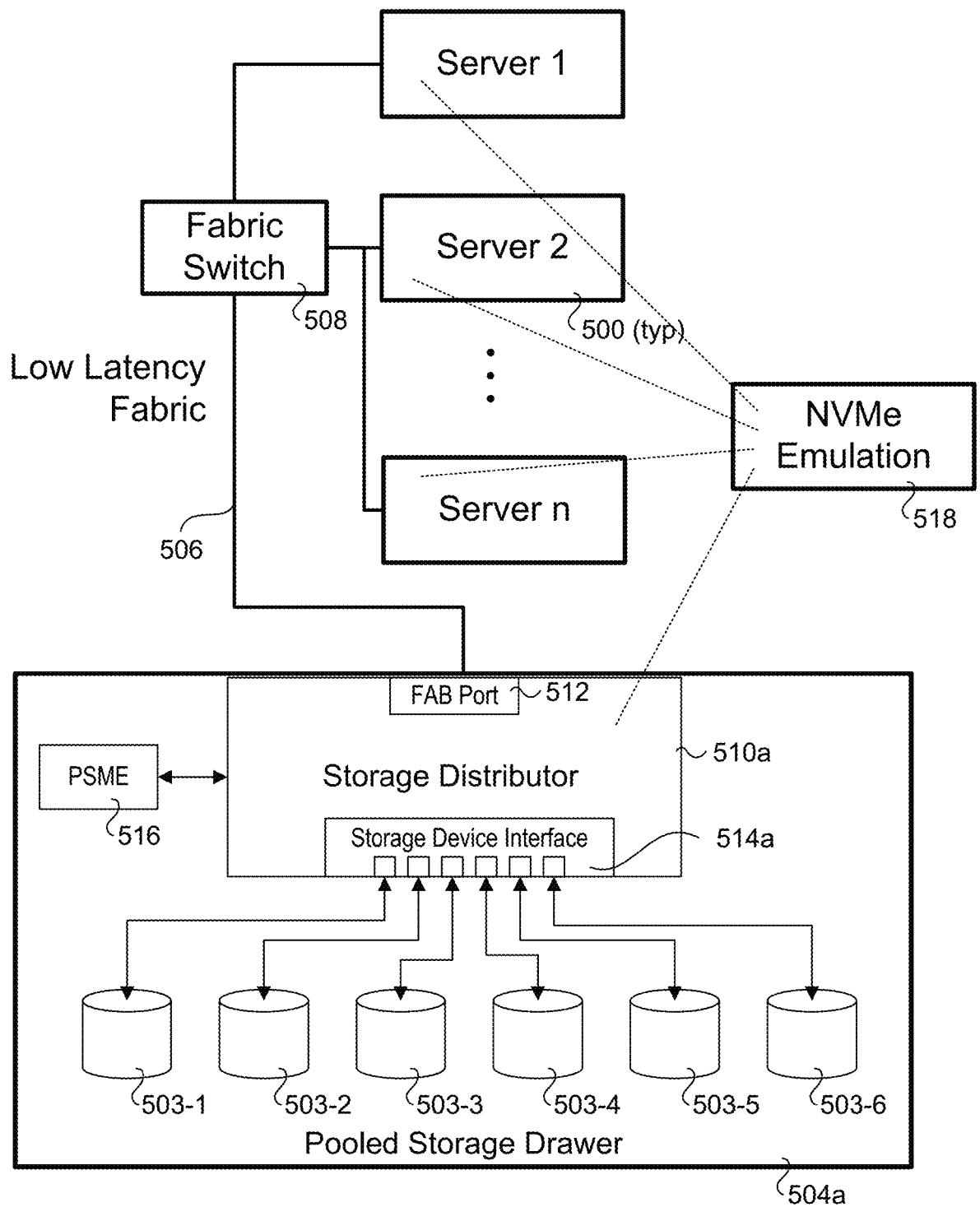
FIG. 5a is a schematic diagram illustrating an alternative implementation of the scheme of FIG. 5 under which NVMe emulation is implemented to enable access to non-NVMe storage devices over the low latency fabric.

In addition to using NVMe storage devices in pooled storage devices, embodiments may use non-NVMe storage devices in combination with NVMe device emulation. One embodiment of this approach is shown in FIG. 5a, which is similar to the embodiment shown in FIG. 5, but with the following differences. Pooled storage drawer 504 has been replaced by a pooled storage drawer 504a that includes storage devices 503-1 . . . 503-6. Generally, various types of storage devices may be used, including but not limited to solid state drives (SSDs), magnetic disk drives and optical storage devices. Pooled storage drawer 504a further includes a storage distributor 510a include a storage device interface 514a that is configured to interface to storage devices 503-1 . . . 503-6.

Under one aspect of a non-NVMe storage device scheme, software and/or firmware providing NVMe emulation is implemented at either storage distributor 510a, in servers 500, or a combination of the two (i.e., part of the NVMe emulation is performed by software and/or firmware in a server 500 and another part is performed by software and/or firmware in storage distributor 510a. Under an emulated NVMe storage device implementation, the NVMe emulation enables existing NVMe software, such as NVMe device drivers running on a server to access non NVMe storage devices over fabric 506 without requiring any changes to the NVMe device drivers.

Figure 6:
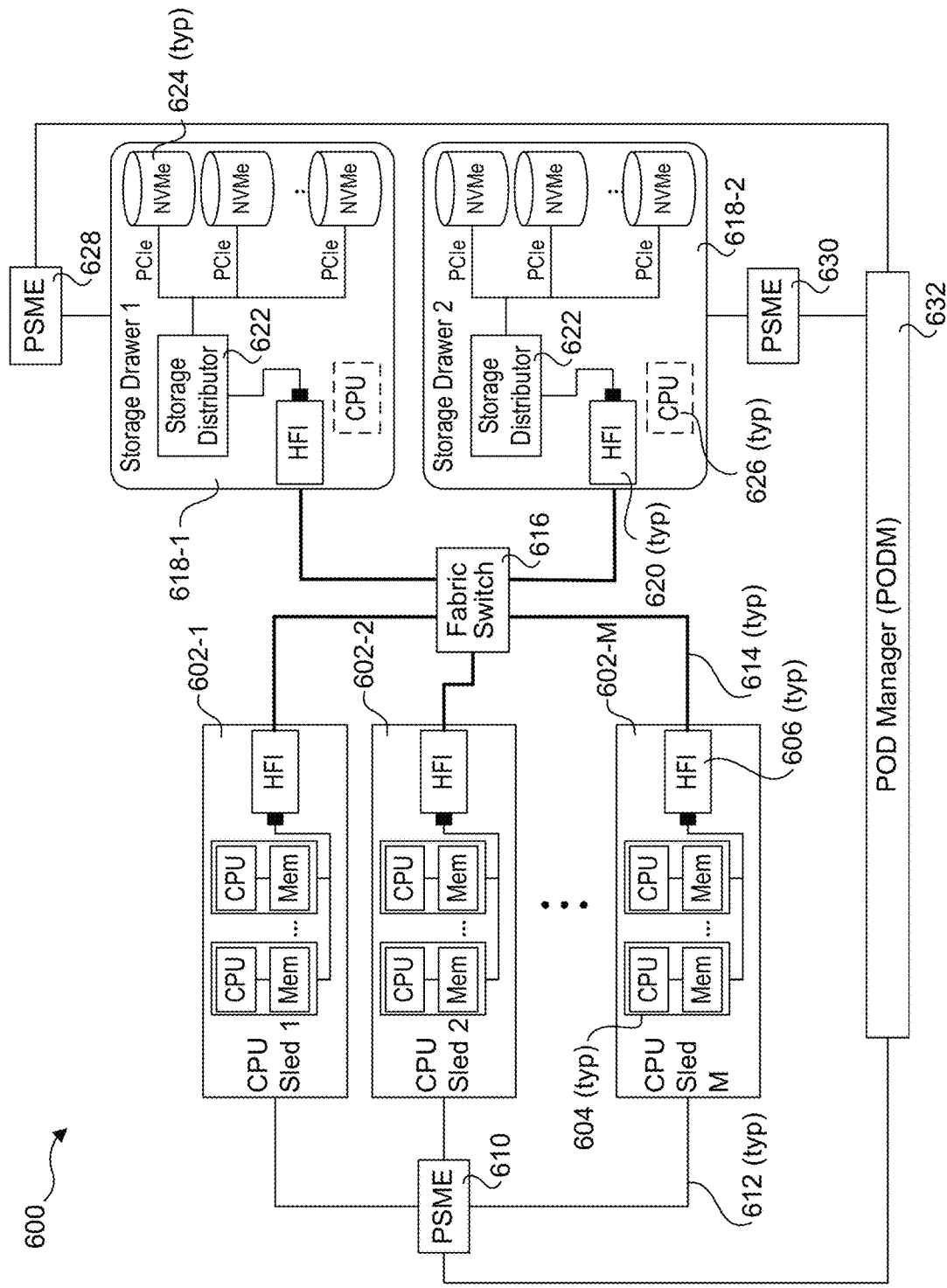
FIG. 6 is a schematic diagram of an implementation environment including a plurality of CPU sleds and storage drawers communicatively coupled via a fabric, according to one embodiment.

An exemplary NVMeOF storage architecture 600 corresponding to one embodiment of an implementation under an RSD environment is shown in FIG. 6. NVMeOF storage architecture 600 includes a plurality of CPU sleds 602-1-602-M, also labeled Sled 1, Sled 2 . . . Sled M. Each CPU sled 602 includes one or more compute nodes 604 including one or more CPUs and memory, and an HFI 606. Each CPU sled 602 is connected to a PSME 610 via a high speed link 612, such as a high speed Ethernet link or an SiPh optical link.

Each of HFIs 606 is connected to an OPA fabric including a plurality of fabric links 614 and a fabric switch 616. The OPA fabric facilitates high-speed, low-latency communication between compute nodes 604 and a pair of pooled storage drawers 618-1 and 618-2. Each of pooled storage drawers 618-1 and 618-2 includes an HFI 620 and a storage distributor 622 coupled to a plurality of NVMe storage devices 624 over a PCIe interconnect hierarchy. A pooled storage drawer may also include a CPU 626. In one embodiment, a storage distributor is implemented as a System on a Chip including a CPU (not shown). Each of pooled storage drawers 618-1 and 618-2 is coupled to a respective PSME 628 and 630, while PSMEs 610, 628, and 630 are connected to a POD manager 632.

Figure 6A:
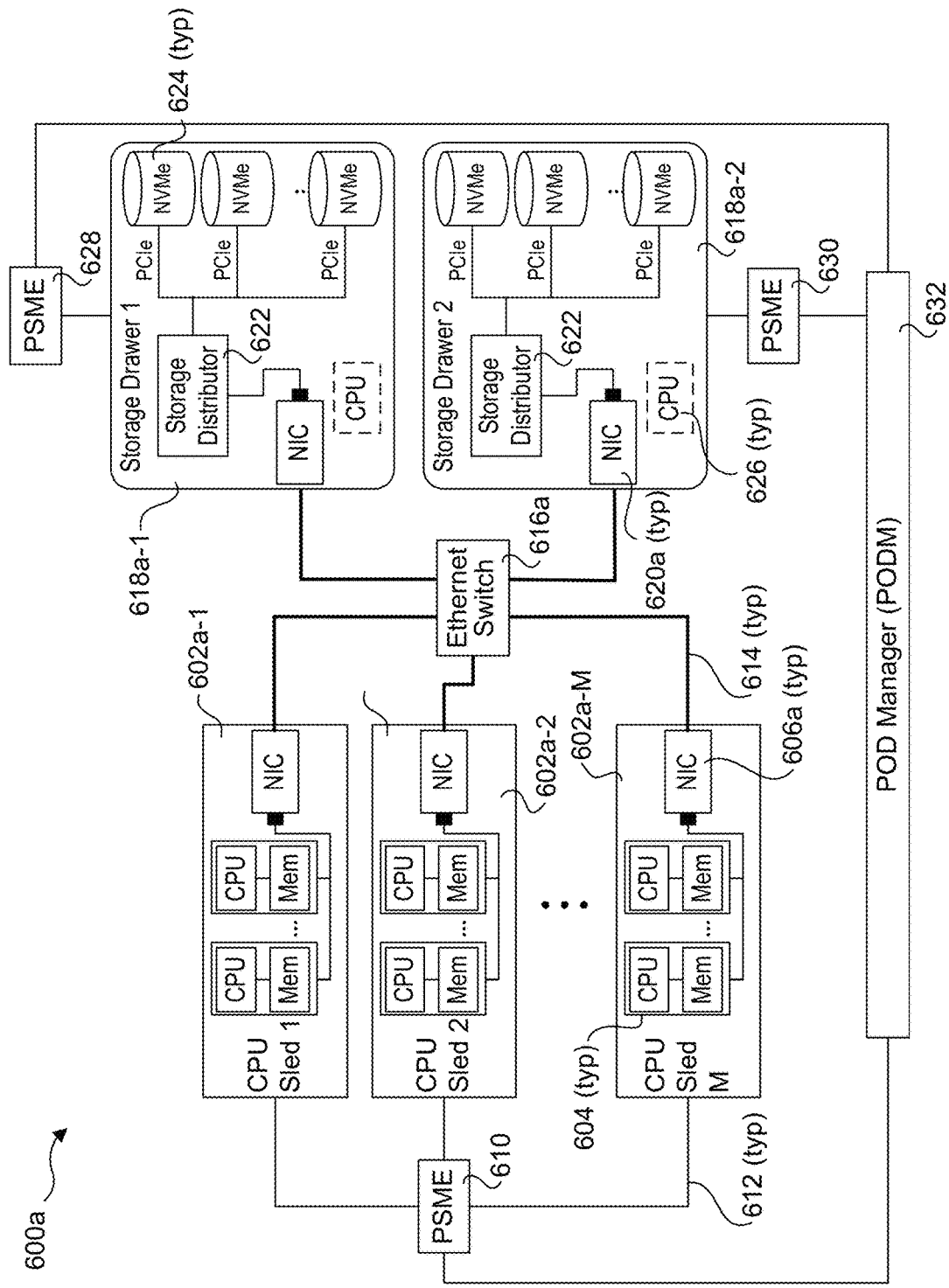
FIG. 6a is a schematic diagram shown an implementation environment employing an Ethernet fabric, according to one embodiment.

FIG. 6a shows an embodiment NVMeOF storage architecture 600a that uses a high-speed Ethernet fabric in place of the OPA fabric shown in FIG. 6. Generally, aspects of NVMeOF storage architectures 600 and 600a are similar, with the differences corresponding to components with an appended 'a' in their reference numbers. These components include CPU sleds 602a-1-602a-M, which now include network interface controllers (NICs) 606a in place of HFIs 606, an Ethernet switch 616a in place of fabric switch 616 and pooled storage drawers 618a-1 and 618a-2, which now include NICs 620a in place of HFIs 620.

In addition to the fabrics shown, other types of fabrics may be used as well, including InfiniBand and Gen-Z fabrics. Generally, the primary differences would be substitution of InfiniBand Host Controller Adaptors (HCAs) in place of the illustrated fabric controllers for InfiniBand fabrics, and Gen-Z interfaces in place of the fabric controllers for Gen-Z fabrics.

Exemplary Network/Fabric Controller Implementation of NVMeOF using VMD

FIG. 7 shows an embodiment of a hardware-based implementation of NVMeOF using VMD. Under the implementation, a compute node 700 is linked in communication with a storage node 702 via a fabric including fabric links 704 and 706 and a fabric switch 708. As shown, compute node 700 is an "initiator," while storage node 702 is a "target."

Compute node 700 includes a processor 710 including a core section 712 including a plurality of processor cores 714 and PCIe root controller 716. For simplicity, additional details of processor 710, caches, interconnects, a memory controller(s), and PCIe interfaces are not shown. PCIe root controller 716 is coupled to a PCIe-based NVMe drive interface 718 and to a PCIe-based network interface controller 720.

Storage node 702 is generally illustrative of an aggregated storage entity in the system architecture, such as a pooled storage drawer under RSD, and includes a network interface 722, a storage distributor 724, and an NVMe drive interface 726 coupled to N NVMe storage devices, including NVMe storage devices 728, 730, and 732. Storage node 702 is also depicted as including an optional processor 734 having one or more cores 736.

Generally, a given compute node may use local and/or remote storage resources. As used herein, a "local' storage resource is a storage device that is directly coupled to a compute node, such as via a storage device interfaces. In contrast, a "remote" storage device corresponds to a storage device that is accessed over a fabric, such as storage devices in pooled storage drawers. In the illustrated embodiment, compute node 700 is coupled to two local NVMe storage devices 738 and 740 coupled to NVMe drive interface 718. These NVMe storage devices are also labeled NVMe L1 (local 1) and NVMe L2 (local 2).

Compute node 700 is also configured to access two virtual NVMe storage devices 742 and 744, also labeled NVMe V1 (virtual 1) and NVMe V2 (virtual 2). From the perspective of software running on compute node 700, virtual NVMe storage devices 742 and 744 are local NVMe drives that are directly connected to the compute node. In reality, virtual NVMe storage devices 742 and 744 are physically implemented as NVMe storage devices 728 and 730, respectively.

In the embodiment of FIG. 7 the virtualization of NVMe storage devices is implemented primarily in hardware as part of an embedded function in NIC 720. As illustrated, NIC 720 includes two embedded functions: a network function 746 and an NVMe function 748. Network function 746 comprises embedded logic and functionality that is implemented by a conventional NIC to support network or fabric operations. For example, in an implementation under which NIC is an Ethernet NIC, network function 746 includes hardware-based facilities for handling the Physical (PHY) and Media Access Channel (MAC) layers for the applicable Ethernet protocol.

NVMe function corresponds to added (to the NIC) functionality to support virtualization of NVMe storage devices. For illustrative purposes, virtual NVMe storage devices 742 and 744 are shown connected to NVMe function 748; in reality, there are no NVMe storage devices connected to NVMe function 748. At the same time, NVMe function exposes the existence of such NVMe storage devices to an operating system as part of the enumerated PCIe device hierarchy.

In further detail, during a system boot the PCIe device and interconnect hierarchy is enumerated as part of conventional PCIe operations. Each PCIe device in the system is enumerated, and the information corresponding to the enumerate PCIe devices is exposed to the operating system running on the compute node. Under the embodiment of FIG. 7, the software includes an operating system (OS) 750 and a NIC+NVMe driver 752. NIC+NVMe Driver is implemented as a software interface between NIC 720 and OS 750. During the PCIe enumeration process, NCI+NVMe driver 752 exposes (to OS 750) NIC 720 as two separate devices: 1) a NIC; and 2) an NVMe interface connected to two local NVMe storage devices.

A portion 751 of the enumerated PCIe device hierarchy is shown toward the bottom of the left-hand side of FIG. 7, and includes PCIe root controller 716, NVMe drive interface 718 connected to local NVMe drives L1 and L2, a NIC 754 and an NVMe drive interface 756 connected to (virtualized) local NVMe drives L3 and L4. Thus, from the perspective of operating system 750, compute node 700 is directly coupled to four NVMe local drives L1, L2, L3, and L4.

Figure 7A:
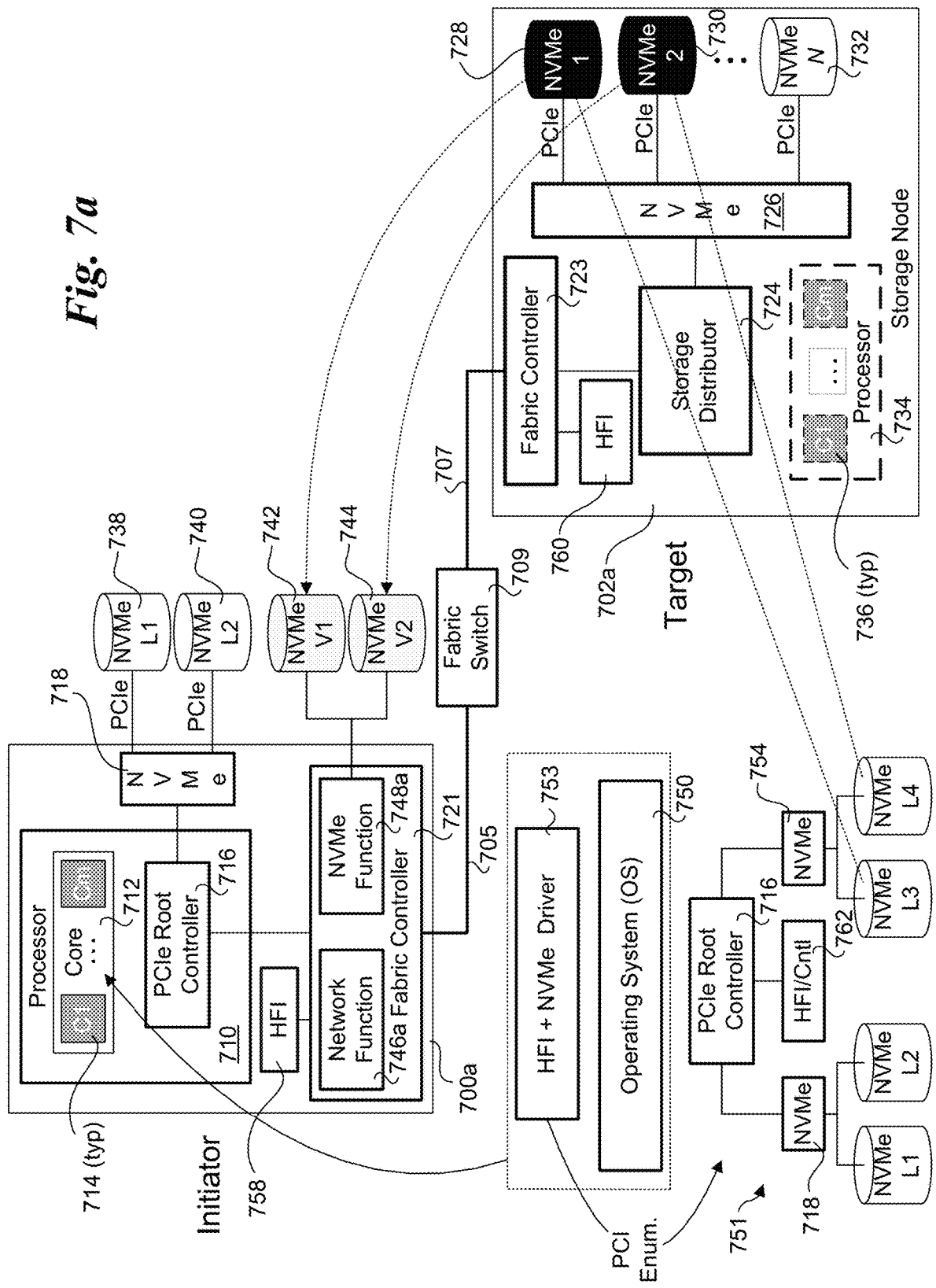
FIG. 7a is a schematic diagram illustrating a virtualized storage access scheme under which remote storage devices on a Target are exposed to an operating system on an Initiator as local storage devices, wherein an NVMe function is implemented in a fabric controller.

FIG. 7a shown an embodiment of a hardware-based implementation of NVMeOF using VMD that using an Omni-Path fabric. As indicated by components sharing the same reference numbers, the embodiments of FIGS. 7 and 7a are similar, with the primary difference relating to FIG. 7 employs an Ethernet fabric and FIG. 7a employs an Omni-Path fabric.

Accordingly, under the embodiment of FIG. 7a, an initiator comprising a compute node 700a is communicatively coupled to target comprising a storage node 702a via an Omni-Path fabric including links 705 and 707 and a fabric switch 709. NIC 720 has been replaced by a fabric controller 721, and network interface 722 has been replaced by a fabric controller 723. As further illustrated, fabric controller 721 includes a network function 746a and an NVMe function 748a, and is coupled to a HFI 758. Fabric controller 723 is coupled to an HFI 760. As shown in the lower left-hand portion of FIG. 7a, the software components include operating system 750, an HFI+NVMe driver 753, and an enumerated PCIe hierarchy portion 751a includes PCIe root controller 716, NVMe drive interface 718 connected to local NVMe drives L1 and L2, an HFI/Fabric controller 762 and an NVMe drive interface 756 connected to (virtualized) local NVMe drives L3 and L4. As with the embodiment of FIG. 7, from the perspective of operating system 750, compute node 700 is directly coupled to four NVMe local drives L1, L2, L3, and L4.

FIG. 7b shows an augmentation to the embodiment of FIG. 7 that supports use of non-NVMe storage devices through NVMe emulation. As illustrated, a storage node 702b includes a storage device interface 726b coupled to a storage distributor 724 (or integrated therewith) and coupled to N storage devices, depicted as storage devices 729, 731, and 733. NVME emulation is implemented by NVMe emulation block 764. As discussed above with reference to FIG. 5a, NVMe emulation may be implemented using software and/or firmware in a pooled storage drawer or storage node, software and/or firmware in a compute node or server, or using a combination of both.

In addition to implementing the NVMe function in a NIC or fabric controller, in one embodiment the NVMe function is implemented in a Field-Programmable Gate Array. Generally, the FPGA may be either implemented on the processor System on a Chip (SoC) (e.g., an embedded IP block) or as a separate component on the platform. Under one embodiment, the FPGA appears (to the software and/or components on the platform) as one or more physically-attached storage devices, such as one or more SSDs. For example, the FPGA can be "attached" to an I/O interface, such as but not limited to a PCIe interface. Under one embodiment of a PCIe implementation, the FPGA provides enumeration information during platform startup indicating it is a storage device controller connected to one or more storage devices. However, in reality the FPGA is not connected to any storage devices, but rather includes storage virtualization logic to implement an NVMe function to access remote storage devices in remote storage nodes that are accessed over the fabric.

Figure 7C:
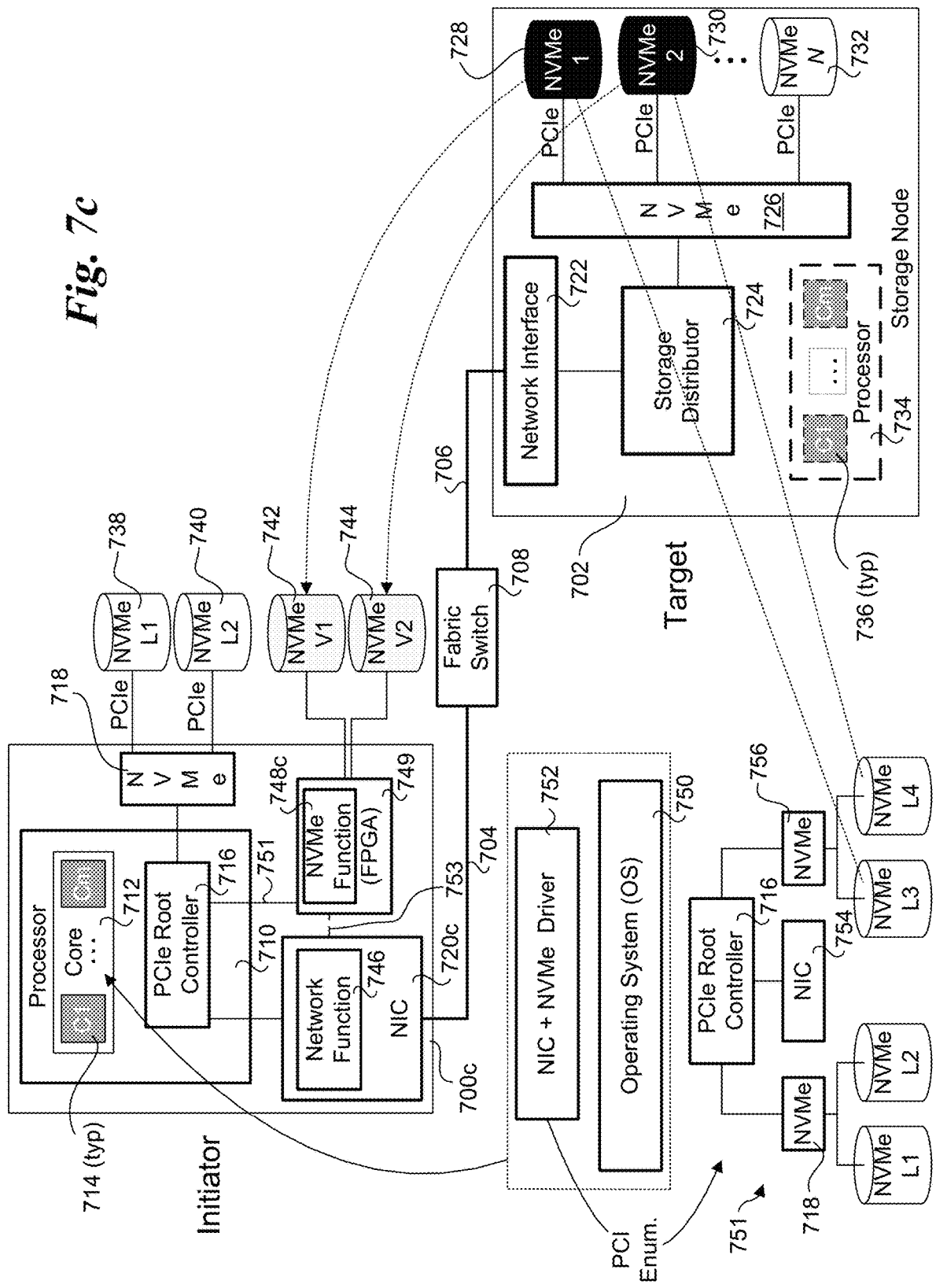
FIG. 7c is a schematic diagram illustrating a virtualized storage access scheme under which remote storage devices on a Target are exposed to an operating system on an Initiator as local storage devices, wherein an NVMe function is implemented in a Field Programmable Gate Array (FPGA)

FIG. 7c shows a compute node 700c including an FPGA 749 in which an NVMe function 748c is implemented. As shown, FPGA 749 exposes virtual NVMe storage devices 742 and 744 to the platform, while the actual physical storage devices are located in storage node 702. In the illustrated embodiment, FPGA is connected to PCIe root controller 716 (noting that the FPGA may be connected to a root port (not shown) that in turn is connected to the PCIe root controller). In one embodiment, the link between PCIe root controller (or a PCIe root port) and FPGA 749 is a PCIe link 751. Other types of links between processor 710 and FPGA 749 may be implemented, as well, including a Universal Path Interconnect (UPI) link, an Intel® Accelerator Link, and a Gen-Z link. Optionally, there may be a connection between FPGA 749 and the NIC 720c, as depicted by an optional link 753.

Generally, FPGA may be programmed at the factory, or it may be programmed during boot-up or during runtime using well-known techniques for programming FPGAs and similar programmable logic devices. For example, under one approach a bitstream is downloaded to the FPGA, wherein the bitstream contains instructions for programming the gates in the FPGA.

Exemplary Processor-Based Implementation of NVMeOF Using VMD

In accordance with aspects of some embodiment, Volume Management Device (VMD) components are used to virtualize storage access. VMD is a new technology used to improve PCIe management. VMD maps the entire PCIe trees into its own address space, controlled by a VMD driver, and is enabled in BIOS (to a ×4 Root Port PCIe granularity, in one embodiment). The operating system enumerates the VMD device and OS enumeration for the attached child devices ends there. Control of the device domain goes to a VMD device driver which is child device agnostic. A VMD driver sets up the domain (enumerating child devices) and gets out of the way of the fast path to child devices. A VMD driver may load additional child device drivers that are VMD aware, against the respective child devices.

Interrupts from child devices are seen by the operating system as VMD interrupts and routed first to the VMD driver interrupt service routine (ISR). A VMD driver can re-issue the signal to the corresponding child device driver's ISR.

Figure 8:
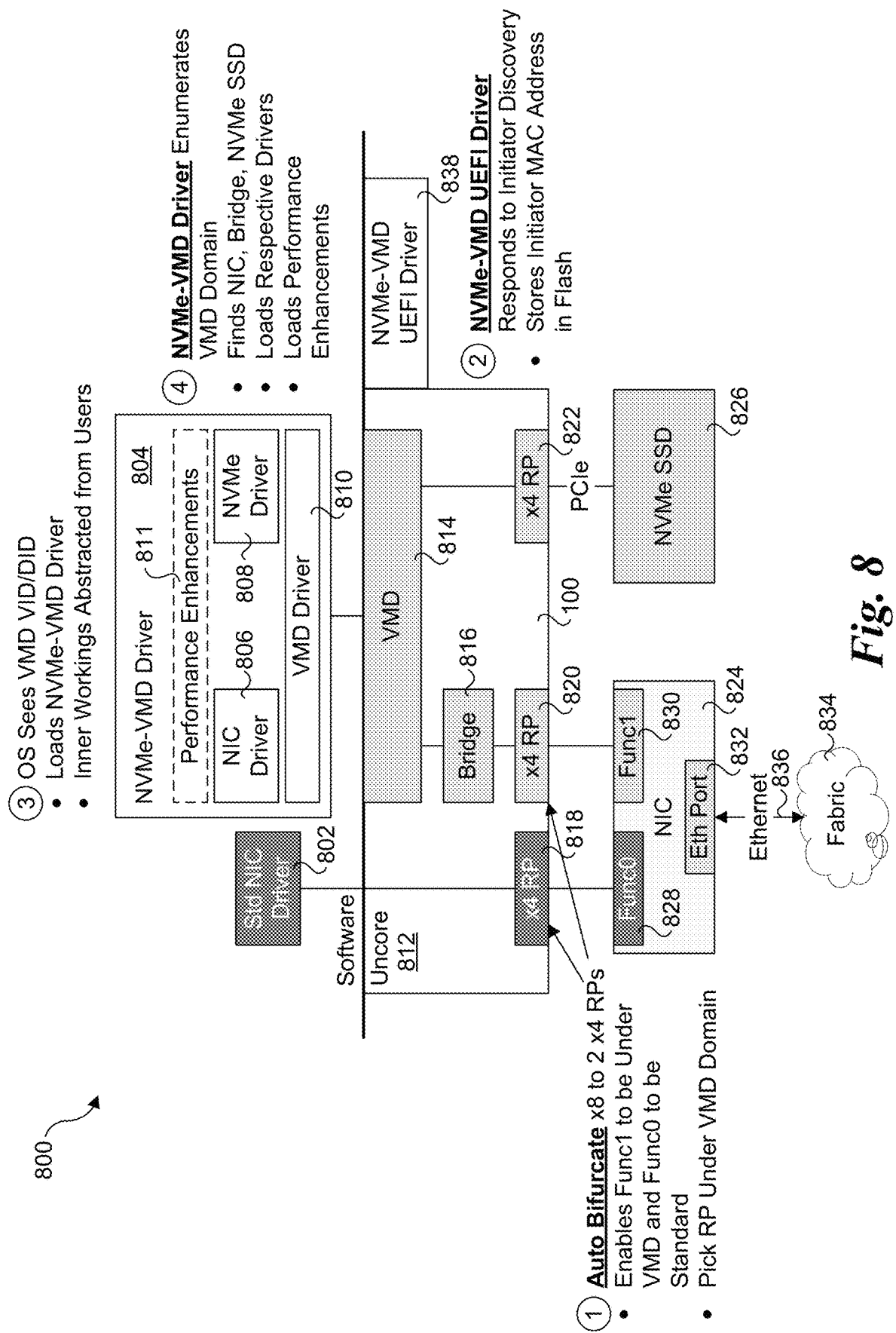
FIG. 8 illustrates an architecture and associated process flow diagram under which virtualization of local and remote NVMe storage devices is implemented through augmentations to a processor in combination with firmware and software drivers.

An architecture and associated process diagram 800 for one embodiment of a VMD implementation is shown in FIG. 8. The architecture is partitioned into a software portion, depicted in the upper part of the diagram, and a hardware portion depicted in the lower part of the diagram. The software portion includes a standard NIC driver 802 and an NVMe-VMD driver 804. The NVMe-VMD driver includes a NIC driver 806, an NVMe driver 808, and a VMD driver 810. NVMe-VMD driver 804 may also include optional performance enhancements 811.

The hardware portion of diagram 800 depicts an "uncore" 812, which generally includes the portion of a processor SoC that isn't part of the processor core, which includes the processor cores and processor caches (e.g., level 1 and level 2 caches). Uncore 812 includes a VMD block 814, a bridge 816, and three 4-lane (×4) PCIe root ports (RPs) 818, 820, and 822. Uncore 812 further includes a PCIe root complex that is not shown to avoid clutter.

The hardware portion further includes a NIC 824 and an NVMe Solid State Drive (SSD) 826. NIC 824 includes two functions 828 and 830, respectively labeled "Func0" and "Func1." NIC 824 further includes an Ethernet port that is connected to an Ethernet fabric 834 via an Ethernet link 836. The hardware portion also includes platform firmware (FW), which includes an NVMe/VMD Unified Extensible Firmware Interface (UEFI) driver 838.

One embodiment of a process for configuring a compute node (e.g., server) operating as an initiator and employing the architecture of diagram 800 proceeds as follows, where operations are depicted by the encircled numbers 1-4. In a first operation, an 8-lane (×8) PCIe root port is automatically bifurcated into two 4-lane root ports. As illustrated, ×4 root port 818 is connected to Func0, while ×4 root port 820 is connected to Func1 of NIC 824. This enables Func1 to be under VMD 814 and Func0 to use standard NIC driver 820, thus enabling NIC 820 to support standard NIC operations.

In a second operation, NVMe-VMD UEFI driver 838 responds to initiator discovery. NVMe-VMD UEFI driver 838 is an extension to the platform's firmware and is loaded as part of the UEFI firm deployed on the platform during boot operations. During this process, NVMe-VMD UEFI driver 838 stores the initiators MAC address in Flash memory (not shown). NVMe-VMD UEFI driver 838 also exposes VMD 814 to the operating system.

Following UEFI firmware loading, operating system boot operations are initiated, which includes loading software-based drivers. As shown in operation '3," the OS sees the VID/DID (virtual identifier, device identifier) of VMD 814, and loads NVMe-VMD driver 804. The NVMe-VMD driver abstracts the inner workings of the NVMe virtualization from the software users (i.e., software components that are used to access an NVMe storage device). This abstraction is performed in a manner that doesn't require any changes to existing user code. Upon being loaded, NVMe-VMD driver 804 enumerates the VMD domain (for VMD 814). It finds NIC 824, bridge 816, and NVMe SSD 826, and loads respective software drivers (not shown). NVMe-VMD driver 804 may also load optional performance enhancements 811 (if supported).

Figure 8A:
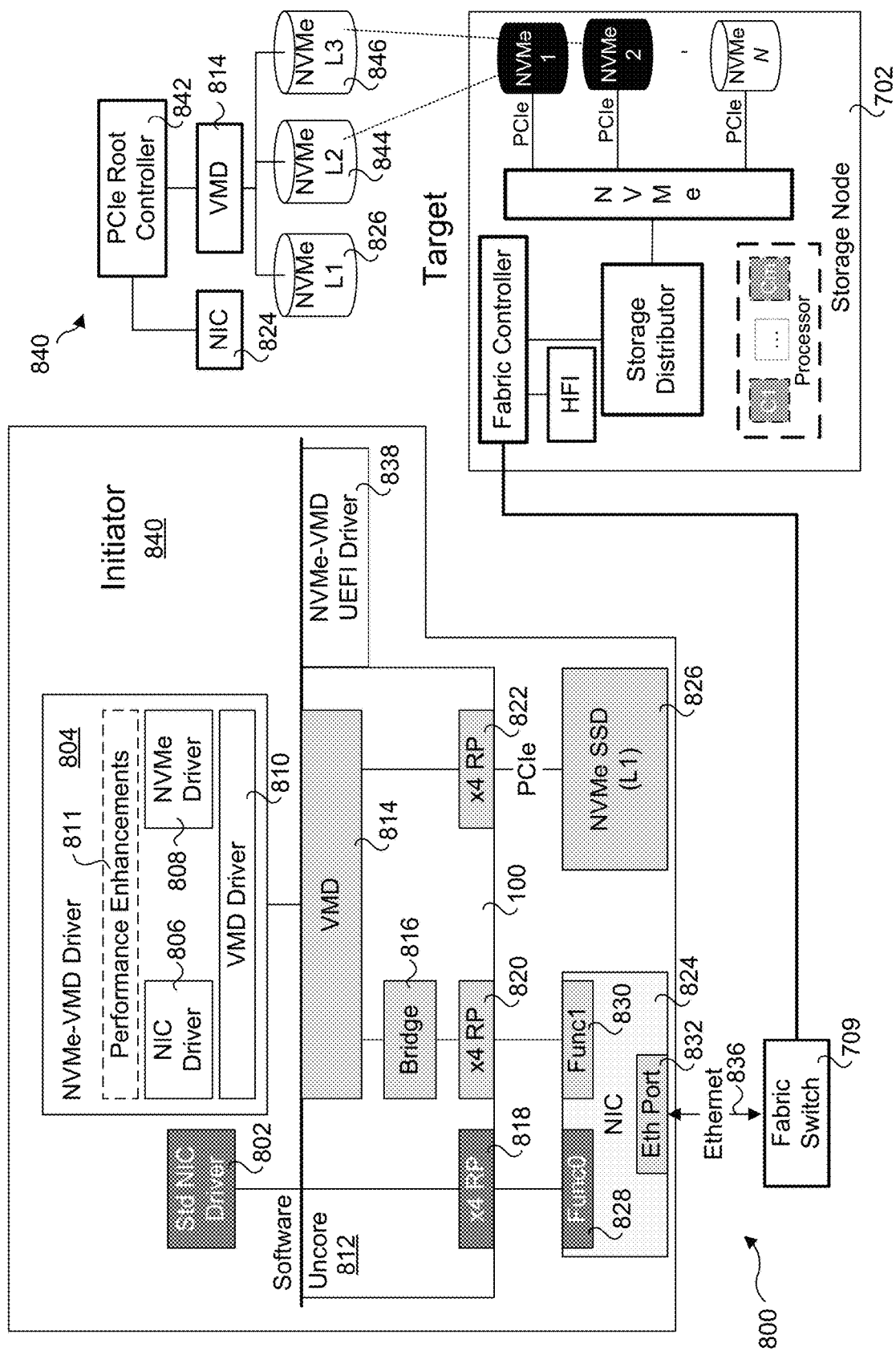
FIG. 8a is a schematic diagram illustrating the architecture of FIG. 8 deployed on an Initiator that accesses remote storage devices on a Target, and further illustrating a virtualized I/O hierarchy that is exposed to an operating system running on the initiator.

FIG. 8a shows a system including the components of architecture 800 being implemented in an initiator 840 that is communicatively coupled to a target comprising a storage node 702 via a fabric including a fabric switch 709. As with previous embodiments, initiator 840 can access both local NVMe SSD 826 and remote NVMe drives, while exposing the remote NVMe drives as local storage devices. For example, as shown by the I/O hierarchy 841, the operating system "sees" a PCI Root Controller 842 to which NIC 824 and VMD 814 are coupled. As further shown each of SSD 826 and the two remote NVMe drives 1 and 2 appear to the operating system as local NVMe drives 844 and 846.

Figure 9:
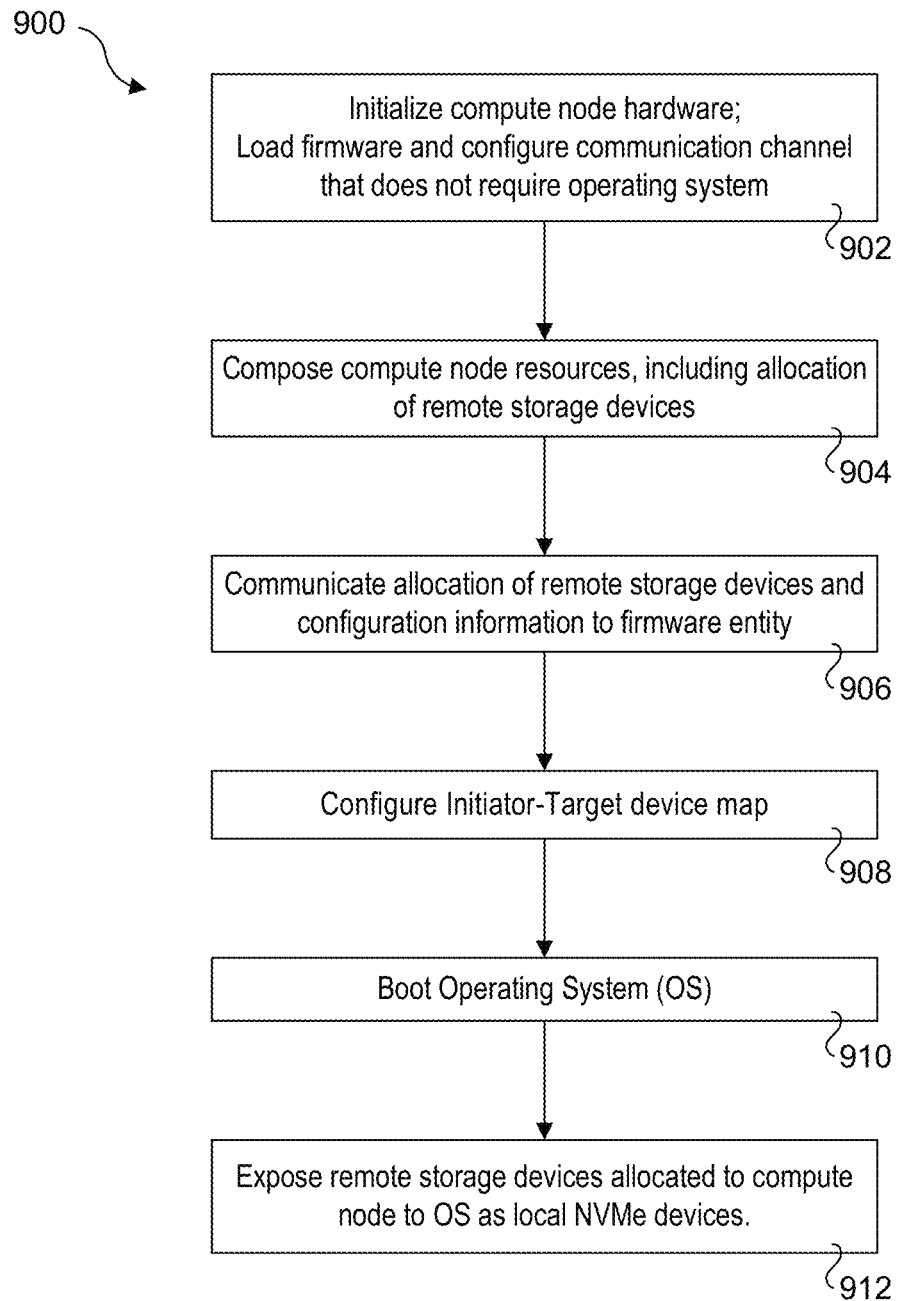
FIG. 9 is a flowchart illustrating operations performed during initialization of compute node, according to one embodiment.

FIG. 9 shows a flowchart 900 illustrating operations performed during initialization of compute node, according to one embodiment. In a block 902 the compute node's hardware is initialized. During this process, the compute node's firmware is loaded, and a communication channel is configured that does not require an operating system to be running on the compute node. This enables the storage resource configuration information to be communicated to the compute node.

In a block 904, the compute node resources are composed, including allocation of remote storage devices. For example, under one process flow a IaaS customer will request use of a compute node with certain resources, and the compute node is composed by the POD manager. In a block 906, the POD manager communicates resource configuration information to the PSME that is attached to the compute node (or is otherwise communicatively-coupled to the pooled compute drawing for the compute node. The PSME then communicates the resource configuration information to firmware running on the compute node hardware via the communication channel set up in block 904.

In a block 904 the firmware configures an initiator-target device map. This contains information for mapping remote storage devices as local storage devices for the compute node. In a block 910, the OS is booted. Subsequently, the remote storage devices allocated to the compute node are exposed to the OS as local NVMe devices.

It is noted that the process flow in flowchart 900 is exemplary and non-limiting. For example, in another embodiment, the configuration-initiator target map is maintained by a software-based driver, rather than a firmware entity. For instance, under architecture 800, the NVMe-VMD driver 804 maintains the initiator-target mapping information.

Figure 10:
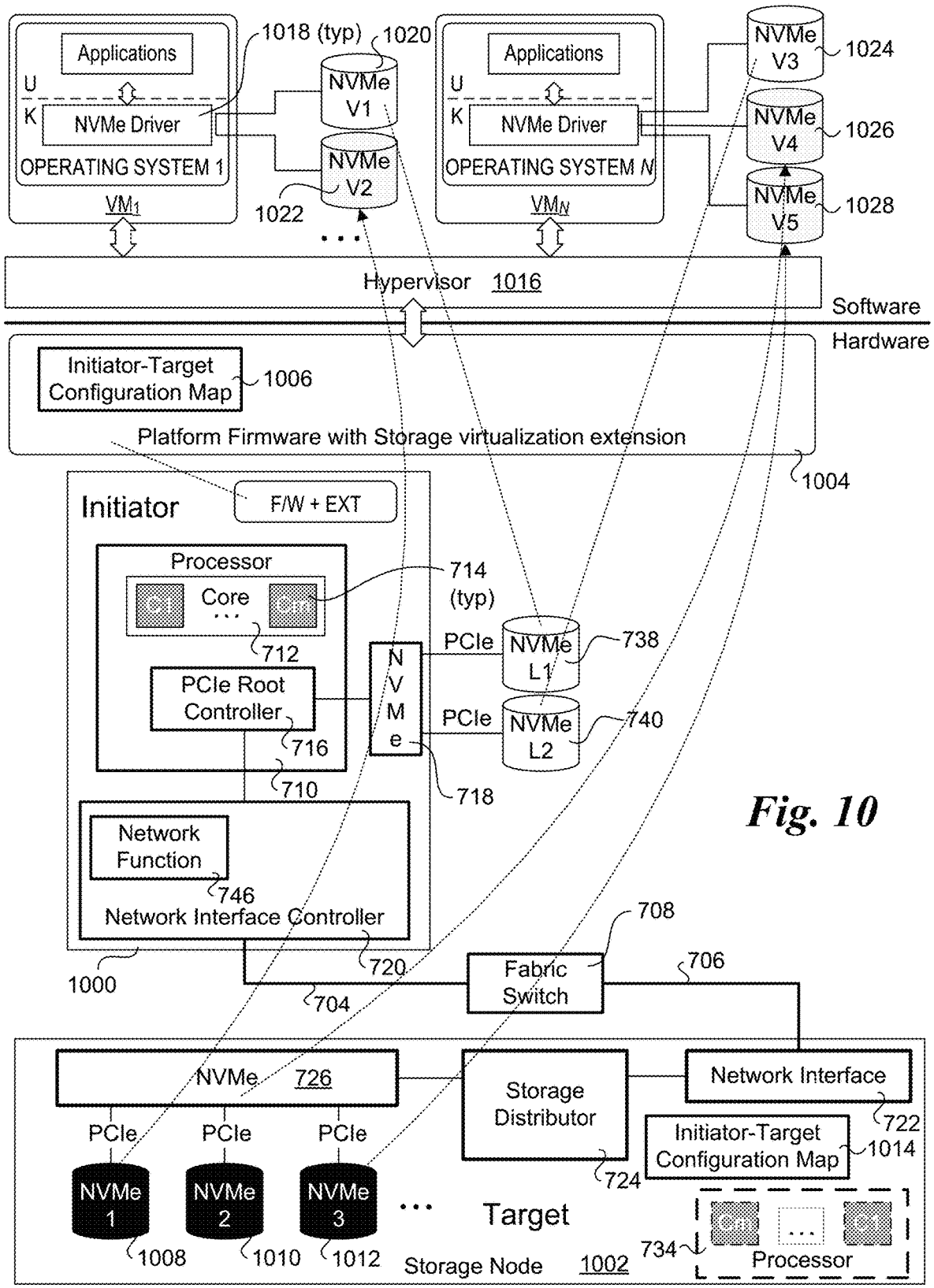
FIG. 10 is a schematic diagram illustrating a firmware-based extension that is used to support a storage virtualization layer that abstracts physical storage devices and exposes them as virtual devices to software running on the compute node, under which the software includes a hypervisor and a plurality of virtual machines.

Exemplary Firmware Storage Virtualization Layer Implementation of NVMeOF Using VMD In accordance with aspects of some embodiments, a firmware-based extension is used to support a storage virtualization layer that abstracts physical storage devices and exposes them as virtual devices to software running on the compute node. One embodiment of this scheme is shown in FIG. 10, which includes a compute node 1000 comprising an initiator coupled to storage node 1002 via a fabric including fabric links 704 and 706 and fabric switch 708. As depicted by like-numbered components in FIGS. 7 and 10, compute node 100 includes a processor 710 having a core 712 with multiple cores 714, and a PCIe Root Controller 716 to which a PCIe-based NVMe drive interface 718 is coupled. As further shown, a pair of local NVMe drive 738 and 740 are coupled to NVMe drive interface 718, Compute node 1000 further includes platform firmware with a storage virtualization extension 1004. This is a firmware-based component that implements a layer of abstraction between local and remote physical storage devices by virtualizing the storage devices, exposing them to software running on the compute node, such as an operating system, as local NVMe storage devices. As further shown, platform firmware with a storage virtualization extension 1004 includes an initiator-target configuration map 1006 that includes information for mapping virtual drives to their physical counterparts.

Storage node 1002 is similar to storage node 702, and includes a network interface 722, a storage distributor 724, and an NVMe drive interface 726 to which multiple NVMe storage devices are coupled, as depicted by NVMe drives 1008, 1010, and 1012. As before, storage node 1002 may further include an optional processor 734. Storage node 1002 also includes an Initiator-Target configuration map 1014.

As discussed above, the platform firmware with storage virtualization extension virtualizes the physical storage resources and exposes them as local NVMe storage devices to software running on the platform. In the embodiment of FIG. 10, the software includes a Type-1 hypervisor 1016. Type-1 hypervisors, also known as "bare-metal" hypervisors, run directly on platform hardware without an operating system and are used to abstract the platform's physical resources. As further shown, hypervisor 1016 hosts a plurality of virtual machines, depicted as $VM_1 \ldots VM_N$. Each of $VM_1$ and $VM_N$ run a respective operating system including an NVMe driver 1018 that is part of the operating system kernel (K) and run one or more applications in the operating system's user space (U).

Under the embodiment of FIG. 10, virtual machines are composed rather than physical compute nodes. As before, in one embodiment this is facilitated by the POD manager and a PSME that is communicatively-coupled to the compute node. Moreover, during initialization of the compute node hardware, a communication channel is configured that enables the PSME to convey configuration information to platform firmware with a storage virtualization extension 1004. This includes allocation of the local and remote storage resources to the virtual machines $VM_1 \ldots VM_N$.

As shown in the FIG. 10, local NVMe drive 738 and remote NVMe drive 1008 have been allocated to $VM_1$ as local virtual NVMe drives 1020 and 1022. Meanwhile, local NVMe drive 740 and remote NVMe drives 1010 and 1012 have been allocated to $VM_N$ as virtual NVMe drives 1024, 1026, and 1028. In connection with the allocation of physical storage resources to the virtual machines, each of Initiator-Target configuration map 1006 and Initiator-Target configuration map 1014 are updated with mappings between the virtual NVMe drives and remote NVMe drives accessed via the Target (storage node 1002).

The primary use of Initiator-Target configuration map 1006 is to map storage access requests from the NVMe drivers 1018 to the remote NVMe drives. Internally, these storage access requests are encapsulated into fabric packets that are sent to the Target via the fabric. For an Ethernet fabric, these requests are encapsulated in Ethernet packets that are transferred over the Ethernet fabric via Ethernet frames. For other types of fabrics, the storage access requests are encapsulated in the fabric packet/frame applicable to that fabric.

The mapping information in Initiator-Target configuration map 1014 at the Target is used for a different purpose. The Target uses the Initiator-Target mapping information to ensure that each of the Target's storage devices can only be accessed by the VM(s) to which each storage device has been allocated. For example, in the configuration shown in FIG. 10 if $VM_1$ attempted to access remote NVMe drive 1010 the Target would check the mapping information in Initiator-Target configuration map 1014, determine that $VM_1$ is not an allowed Initiator for remote NVMe drive 1010, and deny the access request.

Figure 10A:
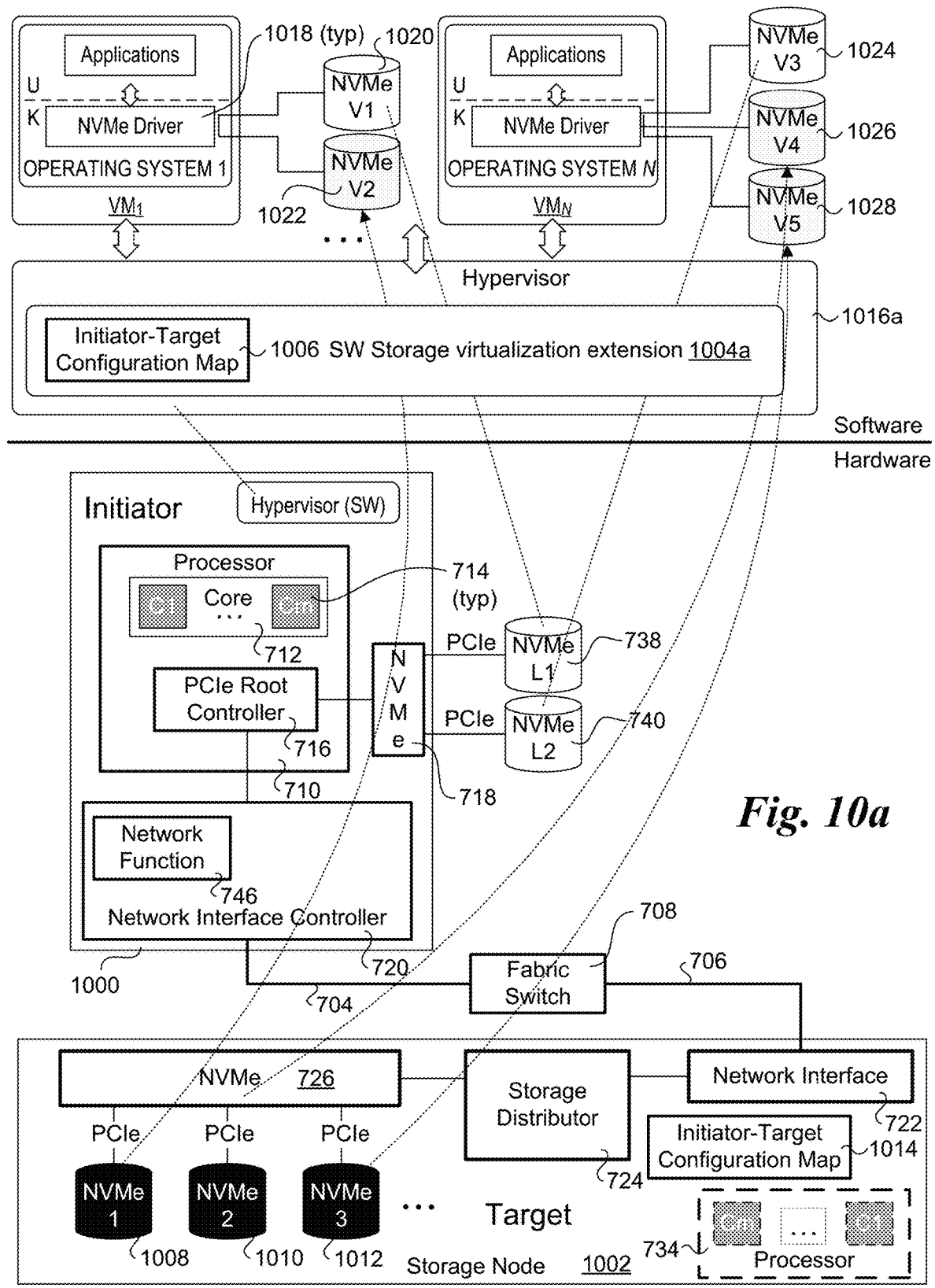
FIG. 10a is a schematic diagram illustrating an augmentation of the embodiment of FIG. 10 employing a software virtualization extension as part of the hypervisor.

FIG. 10a shows an embodiment similar to that shown in FIG. 10 and discussed above, except that the functionality of platform firmware with a storage virtualization extension 1004 is now implemented as a software storage virtualization extension 1004a in a hypervisor 1106 that is part of the platform software rather than platform firmware. In a manner similar to that described above, an initiator-target configuration map 1006 is maintained by software storage virtualization extension 1004a. As before, from the perspective of operating systems $1 \ldots N$, virtual NVMe drives 1022, 1026, and 1028 are exposed as local storage devices.

Figure 11:
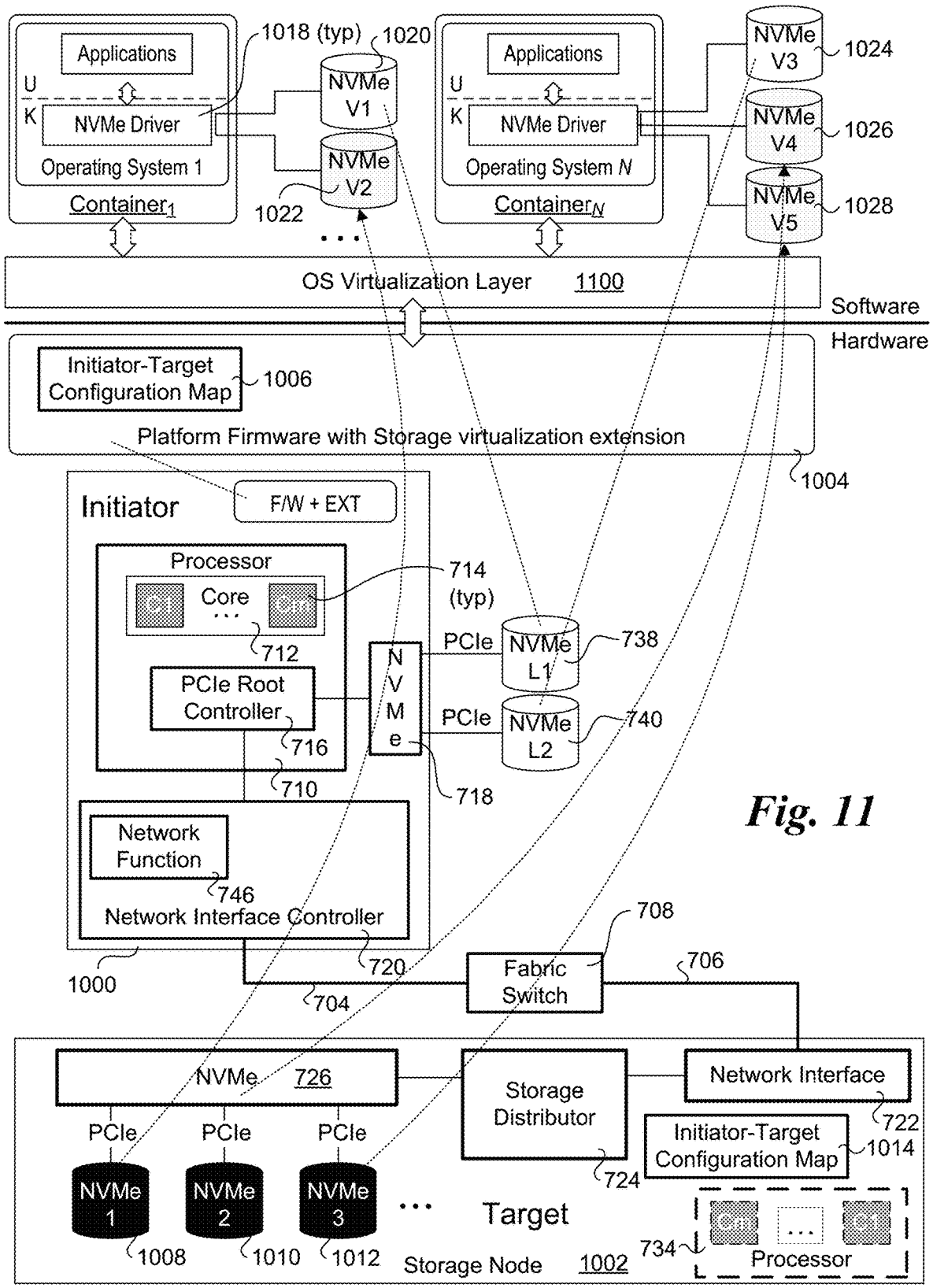
FIG. 11 is a schematic diagram illustrating an augmentation of the embodiment of FIG. 10 employing an operating system virtualization layer and a plurality of containers.

In addition to supporting virtual machine using the platform firmware with storage virtualization extension scheme, container-based are also supported. An exemplary embodiment of one implementation architecture is shown in FIG. 11. As illustrated, all of the Hardware components (including firmware) are the same. The primarily differences between the embodiments of FIGS. 10 and 11 are hypervisor 1016 has been replaced with an OS virtualization layer 1100 and $VM_1 \ldots VM_N$ has been replaced with $Container_1 \ldots Container_N$. In the illustrated embodiment, OS virtualization layer 1100 is depicted as running on the platform hardware in a manner similar to a Type-1 hypervisor. In an alternative scheme, an operating system (not shown) may run on the platform hardware, with the OS virtualization layer running on the operating system. In this case, the storage abstraction is between platform firmware with storage virtualization extension 1004 and the operating system rather than between platform firmware with storage virtualization extension 1004 and the OS virtualization layer.

Figure 11A:
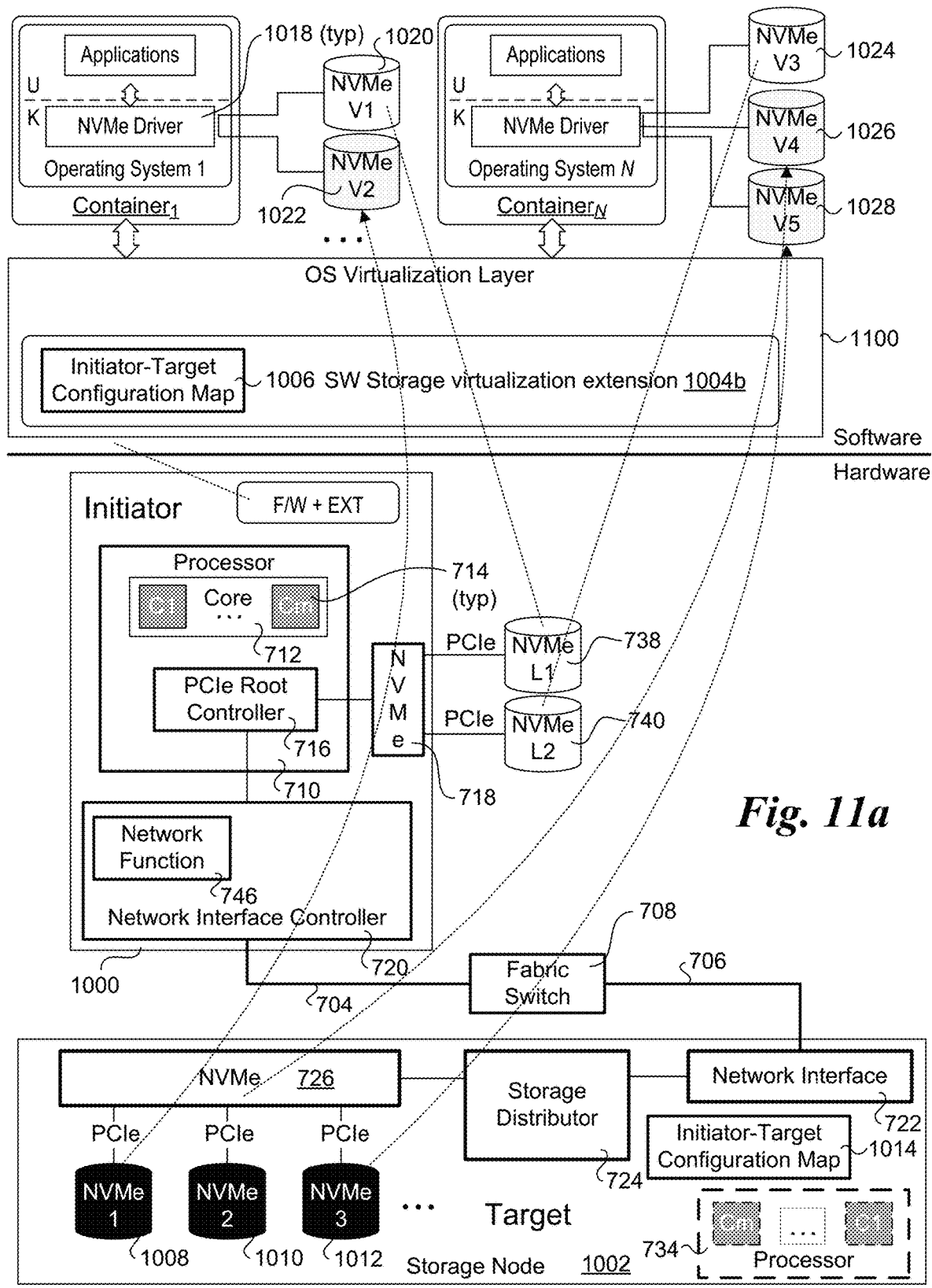
FIG. 11a is a schematic diagram illustrating an augmentation of the embodiment of FIG. 11a employing a software virtualization extension as part of the OS virtualization layer.

FIG. 11a shows an augmentation to the scheme in FIG. 11, wherein the functionality of platform firmware with storage virtualization extension 1104 is implemented as software storage virtualization extension 1004b implemented in an OS virtualization layer 1100a that is part of the platform software.

Figure 12:
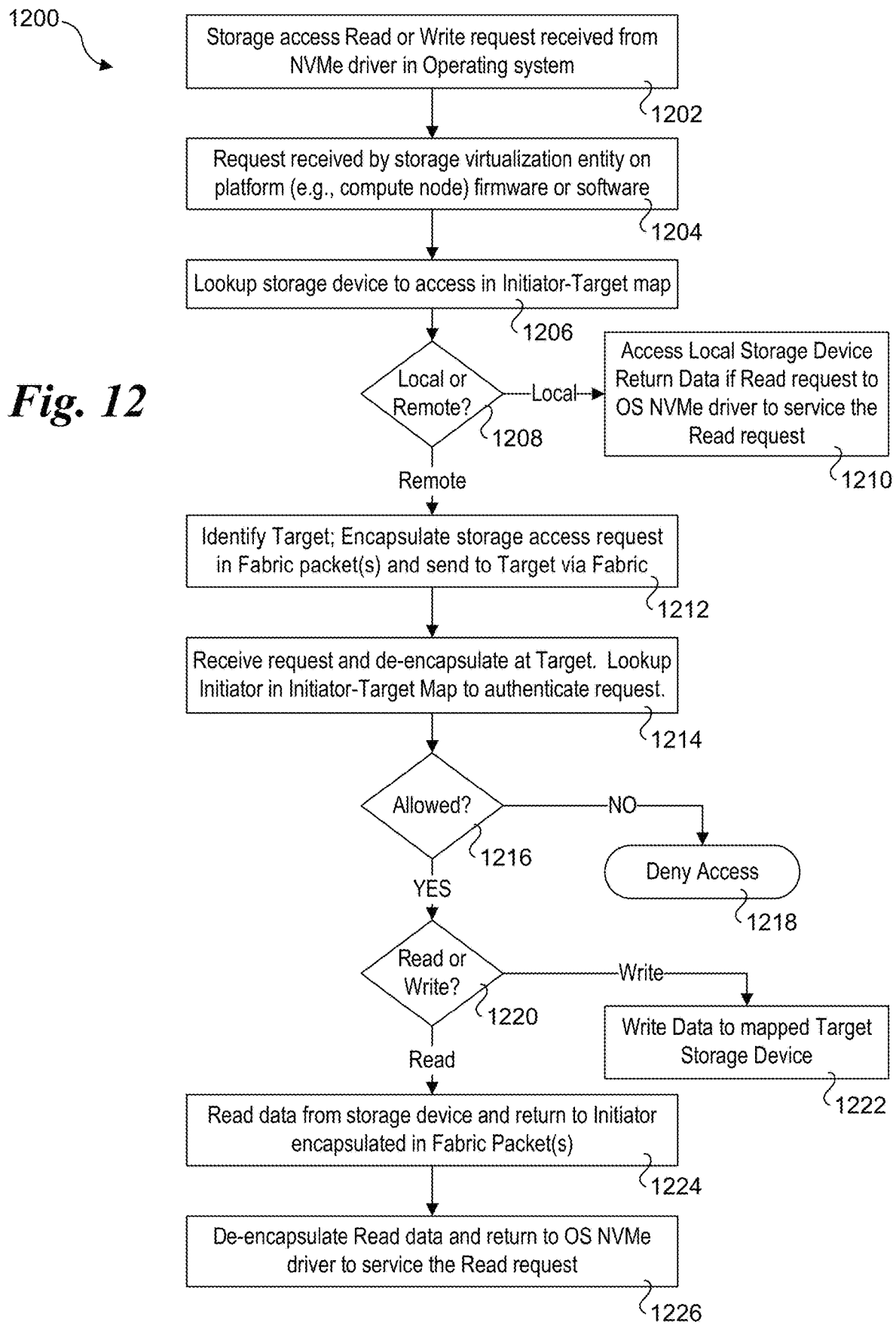
FIG. 12 is a flowchart illustrating operations and logic for implementing a virtualized storage access scheme that may be used with one or more of the embodiments discussed herein.

FIG. 12 shows a flowchart 1200 illustrating operations and logic for implementing a virtualized storage access scheme that may be used with one or more of the embodiments discussed above. In a block 1202 a Read or Write storage access request is received from an operating system NVMe driver. In a block 1204, the request is received by the storage virtualization entity on the platform hardware or software. For example, in the embodiments of FIGS. 7, 7a, 7b, and 10 and 11, the entity receiving the request is a firmware-based entity, while in the embodiments of FIGS. 8 and 8a, 10a, and 11a, the entity is a software-based entity. In the embodiment of FIG. 7c, the storage virtualization entity is implemented in FPGA 749.

In a block 1206 a storage device lookup is performed to determine if the storage device to be accessed is a local device or a remote device. In one embodiment the Initiator-Target map includes mapping information for local storage devices as well as remote devices, and this mapping information is used to identify the storage device and its location. As shown in a decision block 1208, a determination is made to whether the storage device is local or remote. If it is a local device, the logic proceeds to a block 1210 in which the local storage device is access. If the access request is a Write request, the data supplied with the request is written to the storage device. If the access request is a Read request, the data is read from the storage device and returned to the NVMe driver to service the request.

If the lookup in block 1206 identifies the device is a remote device, the logic proceeds to a block 1212 in which the Target is identified. The access request is then encapsulated in a fabric packet (or multiple fabric packets, as applicable), and the fabric packet(s) is/are sent from the Initiator via the fabric to the Target that is identified. In a block 1214, the request is received by the target. The Target de-encapsulates the access request and looks up the Initiator in its Initiator-Target map to determine if the Initiator is allowed to access the storage device identified in the request, as depicted by a decision block 1216. If the answer is NO, the logic proceeds to an end block 1218 in which the accessed is denied. As an option, information identifying the request has been denied can be returned to the requester (not shown).

If the access is allowed, the logic proceeds to a decision block 1220 in which a determination is made to whether the access request is a Read or Write. If it is a Write the logic proceeds to a block 1222 in which the data is written to the applicable storage device on the Target. If the answer to decision block 1220 is Read, the data is read from the applicable storage device and returned to the Initiator in one or more fabric packets that are sent over the fabric, as shown in a block 1224. The Read data in the received fabric packet(s) are then de-encapsulated in a block 1226 and the Read data is returned to the OS NVMe driver to service the Read request.

With respect to accessing virtual NVMe storage devices 742 and 744, the embodiment of FIG. 7c operates in a similar manner to that illustrated in flowchart 1200 with the following difference. Software operating on the compute node issues a storage device read or write request through a storage device driver or the like to access data this is logically stored on one of virtual NVMe storage devices 742 or 744. The Read or Write request is passed via PCIe root controller 716 to FPGA 749. In response to receiving the request, NVMe function 748c in FPGA 749 generates a network message identifying the network address of storage mode 702 as the destination and including the read or write request that is to be sent over the fabric via NIC 720c. In one embodiment, the network message is routed via the PCIe interconnect structure on compute node 700c. Alternatively, the network message is sent over link 751 to NIC 720c. At this point, the operations of blocks 1212, 1214, 1216, 1218, 1220, 1222, 1224, and 1226 are performed in a similar manner to that described above and illustrated in flowchart 1200.

Further aspects of the subject matter described herein are set out in the following numbered clauses:

1. A method implemented by a compute node communicatively coupled to a remote storage node via a fabric, the remote storage node including a plurality of remote storage devices that are accessed by the compute node over the fabric, the method comprising:

determining one or more remote storage devices that have been allocated for the compute node; and exposing each of the one or more remote storage devices to software running on the compute node as a local non-volatile memory express (NVMe) storage device.

2. The method of clause 1, further comprising sending data between the compute node and the remote storage node using an NVMe over fabric (NVMe-OF) protocol.

3. The method of clause 1 or 2, wherein each of the one or more remote storage devices exposed to the operating system as a local NVMe storage device is a remote NVMe storage device.

4. The method of any of the preceding clauses, wherein the compute node includes a local NVMe storage device that is accessed via an NVMe driver configured to access local NVMe storage devices and the software comprises an operating system running on the compute node, further comprising enabling the operating system to access the one or more remote storage devices via the NVMe driver.

5. The method of any of the preceding clauses, wherein the software comprises an operating system that is running on physical compute node hardware, and wherein each of the one or more remote storage devices are exposed to the operating system as a local NVMe storage device through use of a hardware-based component in the physical compute node hardware.

6. The method of clause 5, wherein the hardware-based component comprises a network interface controller or a fabric controller.

7. The method of any of the preceding clauses, wherein the software comprises an operating system is running on physical compute node hardware, and wherein exposing each of the one or more remote storage devices to the software running on the compute node as a local NVMe storage device is implemented by a combination of one or more hardware-based components in the physical compute node hardware and one or more software-based components.

8. The method of clause 7, wherein the one or more software-based components includes an NVMe-Volume Management Device (VMD) driver.

9. The method of clause 8, wherein the NVMe-VMD driver includes a network interface controller (NIC) driver, an NVMe Driver, and a VMD Driver.

10. The method of clause 8, wherein the compute node includes a processor having a VMD component, and wherein the one or more hardware-based components include the VMD component.

11. The method of any of the preceding clauses, further comprising:

virtualizing a physical storage access infrastructure including both local and remote storage resources with platform firmware including a storage virtualization extension; and exposing, via one of platform firmware, an Field Programmable Gate Array (FPGA), and a software-based hypervisor or operation system virtualization layer, each of the one or more remote storage devices to software running on the compute node as a local NVMe storage device.

12. A compute node, configured to be implemented in a data center environment including a plurality of drawers that are interconnected via a fabric, the plurality of drawers including a pooled storage drawer having a plurality of remote storage devices and being communicatively coupled via the fabric to a compute node drawer in which the compute node is configured to be installed, the compute node comprising:

a processor;

memory, coupled to the processor; and a fabric controller or a network interface controller (NIC), operatively coupled to the processor and configured to access the fabric, wherein, when the compute node is installed in the compute node drawer and operating the compute node is configured to expose each of one or more of the plurality of remote storage devices to software running on the compute node as a local non-volatile memory express (NVMe) storage device.

13. The compute node of clause 12, wherein the compute node is configured to communicate with the pooled storage drawer using an NVMe over fabric (NVMe-OF) protocol.

14. The compute node of clause 12 or 13, wherein each of the one or more remote storage devices exposed to the software as a local NVMe storage device is a remote NVMe storage device.

15. The compute node of any of clauses 12-14, wherein the software comprises an operating system including an NVMe driver configured to access local NVMe storage devices, further comprising:
at least one local NVMe storage device,
wherein the compute node is configured to expose the at least one local NVMe storage device and each of the one or more remote storage devices as a plurality of local NVMe storage devices and employ the NVMe driver to access each of the at least one local NVMe storage device and the one or more remote storage devices.

16. The compute node of any of clauses 12-14, wherein the fabric controller or NIC includes embedded hardware that is configured to expose the one or more remote storage devices to the software as local NVMe storage devices.

17. The compute node of any of clauses 12-14, wherein the compute node includes a combination of one or more hardware-based components and one or more software-based components that are configured, upon booting of an operating system, to expose each of the one or more remote storage devices to the operating system as a local NVMe storage device.

18. The compute node clause 17, wherein the one or more software-based components comprise an NVMe-Volume Management Device (VMD) driver.

19. The compute node of clause 18, wherein the NVMe-VMD driver includes a network interface controller (NIC) driver, an NVMe Driver, and a VMD Driver.

20. The compute node of clause 18, wherein the compute node includes a processor having a VMD component, and wherein the one or more hardware-based components include the VMD component.

21. The compute node of clause 12, wherein the compute node further comprises:
platform firmware including a storage virtualization extension; and
software comprising one of a hypervisor or operating system virtualization layer;
and wherein the compute node is further configured to,
virtualize a physical storage access infrastructure including the one or more remote storage devices; and
expose the one or more remote storage devices to the hypervisor or the operating system virtualization layer as local NVMe storage devices.

22. The compute node of any of clauses 12-14, further comprising a Field Programmable Gate Array (FPGA) that is configured to expose the one or more remote storage devices to the software as local NVMe storage devices.

23. The compute node of clause 12, wherein the compute node further comprises:
software comprising one of a hypervisor or operating system virtualization layer with a storage virtualization extension configured to,
virtualize a physical storage access infrastructure including the one or more remote storage devices; and
expose each of the one or more remote storage devices to an operating system in a virtual machine or container hosted by the hypervisor or the operating system virtualization layer as a local NVMe storage device.

24. A system comprising:
a plurality drawers that are interconnected via a fabric, the plurality of drawers including a pooled storage drawer having a plurality of remote storage devices and being communicatively coupled via the fabric to a compute node drawer including a plurality of compute nodes, wherein at least one of the plurality of compute nodes includes,
a processor;
memory, coupled to the processor; and
a fabric controller or a network interface controller (NIC), operatively coupled to the processor and configured to access the fabric,
wherein, when the compute node is operating the compute node is configured to expose each of one or more of the plurality of remote storage devices to software running on the compute node as a local non-volatile memory express (NVMe) storage device.

25. The system of clause 24, further comprising:
a compute drawer management entity, communicatively coupled to the POD manager and compute node,
wherein the system is further configured to,
receive a request from an Infrastructure as a Service (IaaS) customer requesting use of compute resources and storage resources available via the system;
compose a compute node to utilize one or more remote storage devices as local NVMe drives; and
communicate configuration information via the compute drawer management entity to the compute node specifying utilization of the one or more remote storage devices as local NVMe drives.

26. The system of clause 24 or 25, wherein the compute node is configured to access the one or more remote storage devices through use of an NVMe over fabric (NVMe-OF) protocol.

27. The system of any of clauses 24-26, wherein the compute node is an initiator and the pooled storage drawer is a target, and wherein the system is further configured to:
implement initiator-target mapping information that maps remote storage devices utilized by the compute node as being accessed from the pooled storage drawer; and
employ the initiator-target mapping information to facilitate access to the remote storage devices.

28. The system of any of clauses 24-27, wherein the compute node is configured to communicate with the pooled storage drawer using an NVMe over fabric (NVMe-OF) protocol.

29. The system of any of clauses 24-28, wherein each of the one or more remote storage devices exposed to the software as a local NVMe storage device is a remote NVMe storage device.

30. The system of any of clauses 24-28, wherein the software comprises an operating system including an NVMe driver configured to access local NVMe storage devices, and a compute node further comprises:
at least one local NVMe storage device,
wherein the compute node is configured to expose the at least one local NVMe storage device and each of the one or more remote storage devices as a plurality of local NVMe storage devices and employ the NVMe driver to access each of the at least one local NVMe storage device and the one or more remote storage devices.

31. The system of any of clauses 24-28, wherein the fabric controller or NIC includes embedded hardware that is configured to expose the one or more remote storage devices to the software as local NVMe storage devices.

32. The system of any of clauses 24-28, wherein the compute node includes a combination of one or more hardware-based components and one or more software-based components that are configured, upon booting of an operating system, to expose each of the one or more remote storage devices to the operating system as a local NVMe storage device.

33. The system of clause 32, wherein the one or more software-based components comprise an NVMe-Volume Management Device (VMD) driver.

34. The system of clause 33, wherein the NVMe-VMD driver includes a network interface controller (NIC) driver, an NVMe Driver, and a VMD Driver.

35. The system of clause 33, wherein the compute node includes a processor having a VMD component, and wherein the one or more hardware-based components include the VMD component.

36. The system of any of clauses 24-29, wherein the compute node further comprises:

platform firmware including a storage virtualization extension; and software comprising one of a hypervisor or operating system virtualization layer;

and wherein the compute node is further configured to, virtualize a physical storage access infrastructure including the one or more remote storage devices; and expose the one or more remote storage devices to the hypervisor or the operating system virtualization layer as local NVMe storage devices.

37. The system of any of clauses 24-29, further comprising a Field Programmable Gate Array (FPGA) that is configured to expose the one or more remote storage devices to the software as local NVMe storage devices.

38. The system of any of clauses 24-29, wherein the compute node further comprises:

software comprising one of a hypervisor or operating system virtualization layer with a storage virtualization extension configured to, virtualize a physical storage access infrastructure including the one or more remote storage devices; and expose each of the one or more remote storage devices to an operating system in a virtual machine or container hosted by the hypervisor or the operating system virtualization layer as a local NVMe storage device.

39. A non-transitory machine-readable medium having instruction stored thereon configured to be executed by a processor in a compute node in a data center environment including a plurality drawers that are interconnected via a fabric, the plurality of drawers including a pooled storage drawer having a plurality of remote storage devices and being communicatively coupled via the fabric to a compute node drawer in which the compute node is installed, the compute node including a fabric controller or a network interface controller (NIC), operatively coupled to the processor and configured to access the fabric, wherein, the instructions are configured, upon execution by the processor, to expose each of one or more of the plurality of remote storage devices to software running on the compute node as a local non-volatile memory express (NVMe) storage device.

40. The non-transitory machine-readable medium of clause 39, wherein the instructions are firmware instructions.

41. The non-transitory machine-readable medium of clause 40, wherein the software running on the compute node to which the one or more of the plurality of remote storage devices are exposed as local NVMe storage devices comprises a hypervisor.

42. The non-transitory machine-readable medium of clause 40, wherein the software running on the compute node to which the one or more of the plurality of remote storage devices are exposed as local NVMe storage devices comprises an operating system.

43. The non-transitory machine-readable medium of clause 40, wherein the software running on the compute node to which the one or more of the plurality of remote storage devices are exposed as local NVMe storage devices comprises an operating system virtualization layer.

44. The non-transitory machine-readable medium of clause 39, wherein the instructions are software instructions comprising a hypervisor.

45. The non-transitory machine-readable medium of clause 39, wherein the instructions are software instructions comprising an operating system virtualization layer.

46. The non-transitory machine-readable medium of clause 39, wherein each of the one or more remote storage devices exposed to the software as a local NVMe storage device is a remote NVMe storage device.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Letters, such as 'M' and 'N' in the foregoing detailed description and drawings are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented in a data center by a compute node communicatively coupled to a remote storage node via a fabric, the remote storage node including a plurality of remote storage devices that are accessed by the compute node over the fabric, the method comprising:
    prior to booting an operating system on the compute node, composing resources to the compute node including allocation of one or more remote storage devices in the remote storage node for the compute node; and
    exposing each of the one or more remote storage devices allocated to the compute node to software running on the compute node as a local non-volatile memory express (NVMe) storage device.

2. The method of claim 1, further comprising sending data between the compute node and the remote storage node using an NVMe over fabric (NVMe-OF) protocol.

3. The method of claim 1, wherein each of the one or more remote storage devices exposed to the operating system as a local NVMe storage device is a remote NVMe storage device.

4. The method of claim 1, wherein the compute node includes a local NVMe storage device that is accessed via an NVMe driver configured to access local NVMe storage devices and the software comprises an operating system running on the compute node, further comprising enabling the operating system to access the one or more remote storage devices via the NVMe driver.

5. The method of claim 1, wherein the software comprises an operating system that is running on physical compute node hardware, and wherein each of the one or more remote storage devices are exposed to the operating system as a local NVMe storage device through use of a hardware-based component in the physical compute node hardware.

6. The method of claim 5, wherein the hardware-based component comprises a network interface controller or a fabric controller.

7. The method of claim 1, wherein the software comprises an operating system is running on physical compute node hardware, and wherein exposing each of the one or more remote storage devices to the software running on the compute node as a local NVMe storage device is implemented by a combination of one or more hardware-based components in the physical compute node hardware and one or more software-based components.

8. The method of claim 7, wherein the one or more software-based components includes an NVMe-Volume Management Device (VMD) driver.

9. The method of claim 8, wherein the NVMe-VIVID driver includes a network interface controller (NIC) driver, an NVMe Driver, and a VIVID Driver.

10. The method of claim 8, wherein the compute node includes a processor having a VIVID component, and wherein the one or more hardware-based components include the VIVID component.

11. The method of claim 1, further comprising:
virtualizing a physical storage access infrastructure including both local and remote storage resources with platform firmware including a storage virtualization extension; and
exposing, via a Field Programmable Gate Array (FPGA), each of the one or more remote storage devices to software running on the compute node as a local NVMe storage device.

12. A compute node, configured to be implemented in a data center environment including a plurality drawers that are interconnected via a fabric, the plurality of drawers including a pooled storage drawer having a plurality of remote storage devices and being communicatively coupled via the fabric to a compute node drawer in which the compute node is configured to be installed, the compute node comprising:
a processor;
memory, coupled to the processor; and
a fabric controller or a network interface controller (NIC), operatively coupled to the processor and configured to access the fabric,
wherein, when the compute node is installed in the compute node drawer and operating the compute node is configured to expose each of one or more of the plurality of remote storage devices to software running on the compute node as a local non-volatile memory express (NVMe) storage device.

13. The compute node of claim 12, wherein the compute node is configured to communicate with the pooled storage drawer using an NVMe over fabric (NVMe-OF) protocol.

14. The compute node of claim 12, wherein each of the one or more remote storage devices exposed to the software as a local NVMe storage device is a remote NVMe storage device.

15. The compute node of claim 12, wherein the software comprises an operating system including an NVMe driver configured to access local NVMe storage devices, further comprising:
at least one local NVMe storage device,
wherein the compute node is configured to expose the at least one local NVMe storage device and each of the one or more remote storage devices as a plurality of local NVMe storage devices and employ the NVMe driver to access each of the at least one local NVMe storage device and the one or more remote storage devices.

16. The compute node of claim 12, wherein the fabric controller or NIC includes embedded hardware that is configured to expose the one or more remote storage devices to the software as local NVMe storage devices.

17. The compute node of claim 12, wherein the compute node includes a combination of one or more hardware-based components and one or more software based components that are configured, upon booting of an operating system, to expose the one or more remote storage devices to the operating system as local NVMe storage devices.

18. The compute node of claim 17, wherein the one or more software-based components comprise an NVMe-Volume Management Device (VMD) driver.

19. The compute node of claim 18, wherein the NVMe-VIVID driver includes a network interface controller (NIC) driver, an NVMe Driver, and a VIVID Driver.

20. The compute node of claim 18, wherein the compute node includes a processor having a VIVID component, and wherein the one or more hardware-based components include the VIVID component.

21. The compute node of claim 12, wherein the compute node further comprises:
platform firmware including a storage virtualization extension; and
software comprising one of a hypervisor or operating system virtualization layer;
and wherein the compute node is further configured to,
virtualize a physical storage access infrastructure including the one or more remote storage devices; and
expose the one or more remote storage devices to the hypervisor or the operating system virtualization layer as local NVMe storage devices.

22. A system comprising:
a plurality drawers that are interconnected via a fabric, the plurality of drawers including a pooled storage drawer having a plurality of remote storage devices and being communicatively coupled via the fabric to a compute node drawer including a plurality of compute nodes, wherein at least one of the plurality of compute nodes includes,
a processor;
memory, coupled to the processor; and
a fabric controller or a network interface controller (NIC), operatively coupled to the processor and configured to access the fabric,
wherein, when the compute node is operating the compute node is configured to expose each of one or more of the plurality of remote storage devices to software running on the compute node as a local non-volatile memory express (NVMe) storage device.

23. The system of claim 22, further comprising:
a compute drawer management entity, communicatively coupled to a pod manager and compute node,
wherein the system is further configured to,
receive a request from an Infrastructure as a Service (IaaS) customer requesting use of compute resources and storage resources available via the system;
compose a compute node to utilize one or more remote storage devices as local NVMe drives; and
communicate configuration information via the compute drawer management entity to the compute node specifying utilization of the one or more remote storage devices as local NVMe drives.

24. The system of claim 22, wherein the compute node is configured to access the one or more remote storage devices through use of an NVMe over fabric (NVMe-OF) protocol.

25. The system of claim 22, wherein the compute node is an initiator and the pooled storage drawer is a target, and wherein the system is further configured to:
implement initiator-target mapping information that maps remote storage devices utilized by the compute node as being accessed from the pooled storage drawer; and
employ the initiator-target mapping information to facilitate access to the remote storage devices.

* * * * *